(12) United States Patent
Marwali et al.

(10) Patent No.: US 11,735,917 B2
(45) Date of Patent: Aug. 22, 2023

(54) SYSTEMS AND METHODS FOR PARALLELING 3-WIRE AND 4-WIRE 3-PHASE ACTIVE HARMONIC FILTERS

(71) Applicant: SCHNEIDER ELECTRIC USA, INC., Boston, MA (US)

(72) Inventors: Mohammad Nanda Rahmana Marwali, Irvine, CA (US); John Simon Batch, Newberg, OR (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 142 days.

(21) Appl. No.: 17/489,245

(22) Filed: Sep. 29, 2021

(65) Prior Publication Data

US 2022/0360077 A1    Nov. 10, 2022

Related U.S. Application Data

(60) Provisional application No. 63/181,668, filed on Apr. 29, 2021.

(51) Int. Cl.
*H02J 3/01* (2006.01)
*H02J 3/18* (2006.01)
(52) U.S. Cl.
CPC .............. *H02J 3/01* (2013.01); *H02J 3/1842* (2013.01)
(58) Field of Classification Search
CPC .................................. H02J 3/01; H02J 3/1842
USPC ......................................................... 307/105
See application file for complete search history.

(56) References Cited

U.S. PATENT DOCUMENTS

2015/0001947 A1    1/2015  Rozand et al.

FOREIGN PATENT DOCUMENTS

CN         107658876 A       2/2018

OTHER PUBLICATIONS

Extended European Search Report from corresponding European Application No. 22169424.3 dated Sep. 29, 2022.
Gucizhu Chen et al., Unified power quality conditioner for distribution system without reference calculations, Power Electronics and Motion Control Conference, 2004, Conference Proceedings, Ipemc 2004, The 4th International Xi An, China Aug. 14-16, 2004, Piscataway, NJ, USA, IEEE, vol. 3, Aug. 14, 2004 (Aug. 14, 2004), pp. 1201-1206, XP010756002, ISBN: 978-7-5605-1869-5.

*Primary Examiner* — Daniel Kessie
*Assistant Examiner* — Dru M Parries
(74) *Attorney, Agent, or Firm* — Lando & Anastasi, LLP

(57) ABSTRACT

Aspects of the disclosure include a power system comprising at least one three-wire active harmonic filter (AHF) configured to be coupled to, and provide compensation current to, a three-phase load, at least one four-wire AHF configured to be coupled to, and provide compensation current to, the three-phase load, and a controller configured to determine a total compensation current to provide to the three-phase load, the total compensation current including a zero component and a non-zero component, determine an output capacity of the at least one three-wire AHF and the at least one four-wire AHF, calculate a current-compensation ratio based on the output capacity of the at least one three-wire AHF and the at least one four-wire AHF, and control the at least one four-wire AHF to provide at least a portion of the non-zero component of the total compensation current to the three-phase load based on the current-compensation ratio.

20 Claims, 18 Drawing Sheets

SYSTEMS AND METHODS FOR PARALLELING 3-WIRE AND 4-WIRE 3-PHASE ACTIVE HARMONIC FILTERS

CROSS-REFERENCE TO RELATED APPLICATIONS

This application claims priority under 35 U.S.C. § 119(e) to U.S. Provisional Application Ser. No. 63/181,668, titled "SYSTEMS AND METHODS FOR PARALLELING 3-WIRE AND 4-WIRE 3-PHASE ACTIVE HARMONIC FILTERS," filed on Apr. 29, 2021, which is hereby incorporated by reference in its entirety.

FIELD

This disclosure relates generally to filtering devices, and more particularly, to systems and methods for paralleling 3-wire and 4-wire 3-phase active harmonic filters (AHFs).

BACKGROUND

A 3-phase AHF is a power electronics device capable of compensating undesirable components of load currents such that a 3-phase alternating current (AC) source sees only currents that are free of harmonic frequency contents. Additionally, an AHF can also provide fundamental-frequency compensation currents in the form of reactive currents and/or balancing components (negative or zero sequence currents) such that the 3-phase AC source currents achieve a desired fundamental power factor (PF) and/or achieve a 3-phase balanced condition, respectively.

Depending on its capability to provide neutral current compensation, a 3-phase AHF can be classified into one of two types: 4-wire AHF and 3-wire AHF. A 4-wire AHF has a 4-wire output terminal (the 3 regular phases A, B, C and neutral [N]) and can compensate the three regular phases as well as neutral, while a 3-wire AHF has a 3-wire output terminal (A, B, C) with no neutral output connection.

SUMMARY

Described herein are systems and methods for paralleling 3-wire and 4-wire 3-phase AHFs. In one aspect of this disclosure, a method for paralleling 3-wire and 4-wire 3-phase AHFs includes establishing bidirectional communication between one or more 3-wire AHFs and one or more 4-wire AHFs over one or more communications channels, and communicating information between the 3-wire AHFs and the 4-wire AHFs relating to total amperage capacity of the 3-wire AHFs and 4-wire AHFs over the communications channels. On each of the 3-wire AHFs and 4-wire AHFs, at least information relating to total reference current in the system (also sometimes referred to herein as "total compensation current"), and a ratio providing information on how to split the non-zero component of the total reference current between the 3-wire AHFs and 4-wire AHFs, are received from a control device (e.g., master controller or one of the AHFs) in the system. On each of the 3-wire AHFs and 4-wire AHFs, reference current for the 3-wire AHFs and 4-wire AHFs is derived based on the total reference current, the ratio and the total amperage capacity of the 3-wire AHFs and 4-wire AHFs such that each of the 3-wire AHFs and the 4-wire AHFs gets a share of the total reference current proportional to its total amperage capacity.

In accordance with some embodiments of this disclosure, the total reference current is first decomposed into a zero component (e.g., component of current that only 4-wire units can produce) and a non-zero component (e.g., component of current that both the 4-wire and 3-wire units can produce). Additionally, in accordance with some embodiments of this disclosure, after allocating all of the zero component to the four-wire units, the disclosed method introduces a novel calculation technique to split the non-zero component of the total reference current between the 3-wire and 4-wire units such that the remaining capacity of the 4-wire units and the entire 3-wire can be fully utilized.

According to at least one aspect of the disclosure, a power system includes at least one three-wire active harmonic filter (AHF) configured to be coupled to, and provide compensation current to, a three-phase load, at least one four-wire AHF configured to be coupled to, and provide compensation current to, the three-phase load, and a controller configured to determine a total compensation current to provide to the three-phase load, the total compensation current including a zero component and a non-zero component, determine an output capacity of the at least one three-wire AHF and the at least one four-wire AHF, calculate a current-compensation ratio based on the output capacity of the at least one three-wire AHF and the at least one four-wire AHF, and control the at least one four-wire AHF to provide at least a portion of the non-zero component of the total compensation current to the three-phase load based on the current-compensation ratio.

In some examples, the at least one three-wire AHF is coupled in parallel with the at least one four-wire AHF. In various examples, the controller is further configured to control the at least one four-wire AHF to provide a zero compensation current to the three-phase load to satisfy the zero component of the total compensation current. In at least one example, the controller is configured to determine a remaining capacity of the at least one four-wire AHF after allocating the zero component of the total compensation current to the at least one four-wire AHF, and determine whether the remaining capacity of the at least one four-wire AHF exceeds the non-zero component of the total compensation current. In some examples, the controller is configured to allocate an entirety of the total compensation current to the at least one four-wire AHF responsive to determining that the remaining capacity of the at least one four-wire AHF exceeds the non-zero component of the total compensation current.

In various examples, the current-compensation ratio is one, and the at least one three-wire AHF does not provide a compensation current to the three-phase load. In at least one example, the controller is configured to allocate the remaining capacity of the at least one four-wire AHF to non-zero compensation current responsive to determining that the non-zero component of the total compensation current exceeds the remaining capacity of the at least one four-wire AHF. In some examples, the at least a portion of the non-zero component of the total compensation current is a first portion of non-zero compensation current provided to the three-phase load, and a remaining portion of the non-zero compensation current is allocated to the at least one three-wire AHF. In various examples, the current-compensation ratio is equal to the first portion of the non-zero compensation current divided by the non-zero compensation current.

According to at least one aspect of the disclosure, a non-transitory computer-readable medium storing thereon sequences of computer-executable instructions for operating a power system including at least one three-wire active harmonic filter (AHF) and at least one four-wire AHF, each being configured to be coupled to, and provide compensation current to, a three-phase load is provided, the sequences of computer-executable instructions including instructions that instruct at least one processor to determine a total compensation current to provide to the three-phase load, the total compensation current including a zero component and a non-zero component, determine an output capacity of the at least one three-wire AHF and the at least one four-wire AHF, calculate a current-compensation ratio based on the output capacity of the at least one three-wire AHF and the at least one four-wire AHF, and control the at least one four-wire AHF to provide at least a portion of the non-zero component of the total compensation current to the three-phase load based on the current-compensation ratio.

In some examples, the instructions further instruct the at least one processor to control the at least one four-wire AHF to provide a zero compensation current to the three-phase load to satisfy the zero component of the total compensation current. In various examples, the instructions further instruct the at least one processor to determine a remaining capacity of the at least one four-wire AHF after allocating the zero component of the total compensation current to the at least one four-wire AHF, and determine whether the remaining capacity of the at least one four-wire AHF exceeds the non-zero component of the total compensation current. In at least one example, the instructions further instruct the at least one processor to allocate an entirety of the total compensation current to the at least one four-wire AHF responsive to determining that the remaining capacity of the at least one four-wire AHF exceeds the non-zero component of the total compensation current.

In some examples, the current-compensation ratio is one, and the at least one three-wire AHF does not provide a compensation current to the three-phase load. In various examples, the instructions further instruct the at least one processor to allocate the remaining capacity of the at least one four-wire AHF to non-zero compensation current responsive to determining that the non-zero component of the total compensation current exceeds the remaining capacity of the at least one four-wire AHF. In at least one example, the at least a portion of the non-zero component of the total compensation current allocated to the at least one four-wire AHF is a first portion of non-zero compensation current provided to the three-phase load, and a remaining portion of the non-zero compensation current is allocated to the at least one three-wire AHF. In some examples, the current-compensation ratio is equal to the first portion of the non-zero compensation current divided by the non-zero compensation current.

According to at least one aspect of the disclosure, a method of operating a power system including at least one three-wire active harmonic filter (AHF) and at least one four-wire AHF, each being configured to be coupled to, and provide compensation current to, a three-phase load is provided, the method comprising determining a total compensation current to provide to the three-phase load, the total compensation current including a zero component and a non-zero component, determining an output capacity of the at least one three-wire AHF and the at least one four-wire AHF, calculating a current-compensation ratio based on the output capacity of the at least one three-wire AHF and the at least one four-wire AHF, and controlling the at least one four-wire AHF to provide at least a portion of the non-zero component of the total compensation current to the three-phase load based on the current-compensation ratio.

In some examples, the method includes controlling the at least one four-wire AHF to provide a zero compensation current to the three-phase load to satisfy the zero component of the total compensation current, determining a remaining capacity of the at least one four-wire AHF after allocating the zero component of the total compensation current to the at least one four-wire AHF, and determining whether the remaining capacity of the at least one four-wire AHF exceeds the non-zero component of the total compensation current. In various examples, the method includes allocating an entirety of the total compensation current to the at least one four-wire AHF responsive to determining that the remaining capacity of the at least one four-wire AHF exceeds the non-zero component of the total compensation current.

It is understood that there are many features and advantages associated with the disclosed invention, as will be appreciated from the discussions below.

BRIEF DESCRIPTION OF THE DRAWINGS

The foregoing features of the disclosure, as well as the disclosure itself may be more fully understood from the following detailed description of the drawings, in which.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

As briefly discussed in the Background section of this disclosure, a 3-phase active harmonic filter (AHF) can be classified into one of two types: 4-wire AHF and 3-wire AHF, depending on its capability to provide neutral current compensation. A 4-wire AHF has a 4-wire output terminal (the three regular phases A, B, and C, and neutral (N)) and can compensate the three regular phases as well as neutral, while a 3-wire AHF has a 3-wire output terminal (A, B, C) with no neutral output connection.

Figure 1:
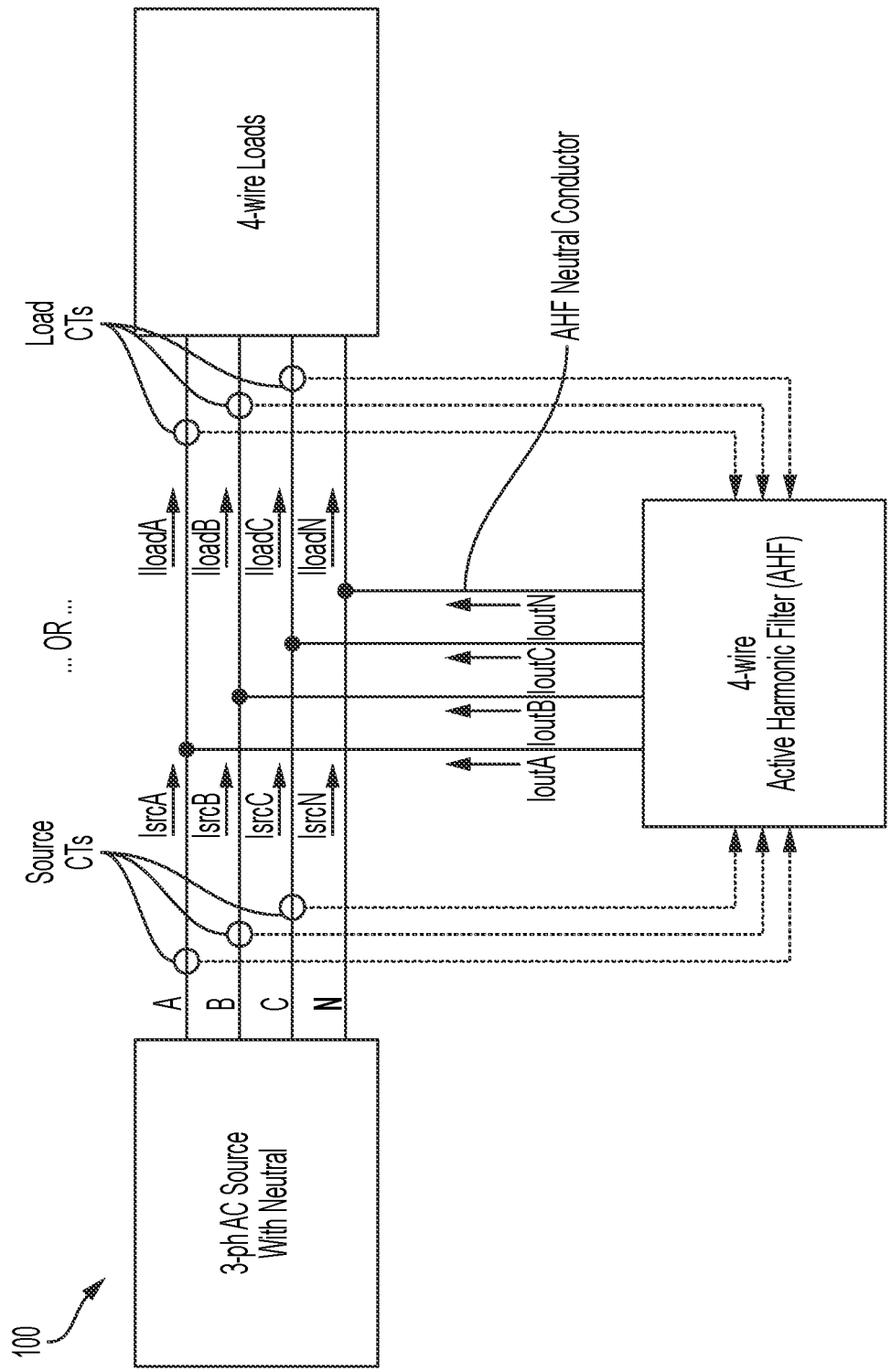
FIG. 1 shows an example 4-wire active harmonic filter (AHF) system.
Figure 2:
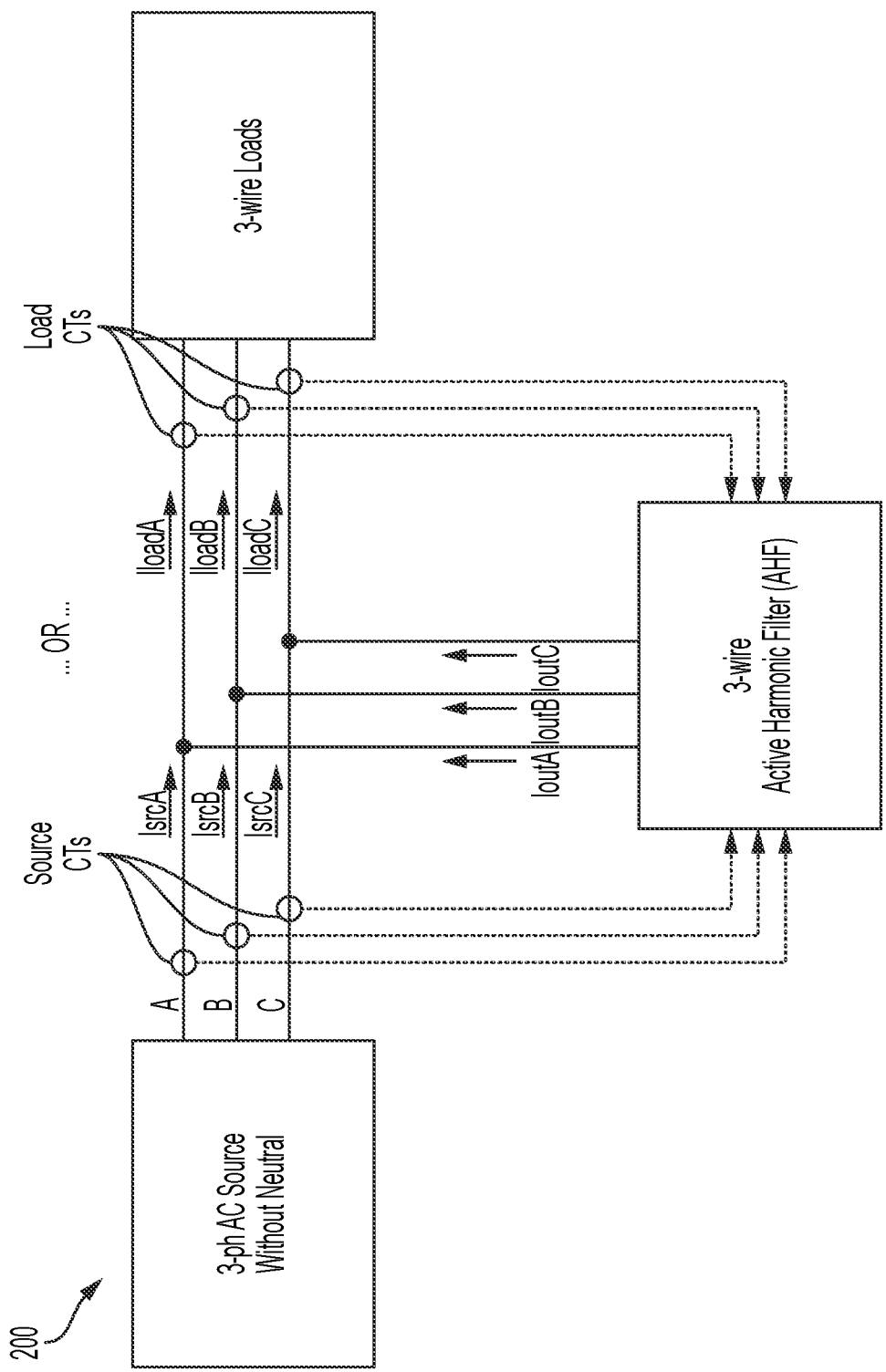
FIG. 2 shows an example 3-wire AHF system.

FIG. 1 shows an example 4-wire AHF system 100 and FIG. 2 shows an example 3-wire AHF system 200. In both systems, a set of current transformers (CTs) or current sensors are used to measure the 3-phase currents either at the source side or at the load side. The AHFs use the information from these CTs to generate compensation currents to achieve the desired objectives. The choice whether to use load CTs or source CTs depends on the reference generation techniques used, which will be discussed later in this disclosure.

Figure 3:
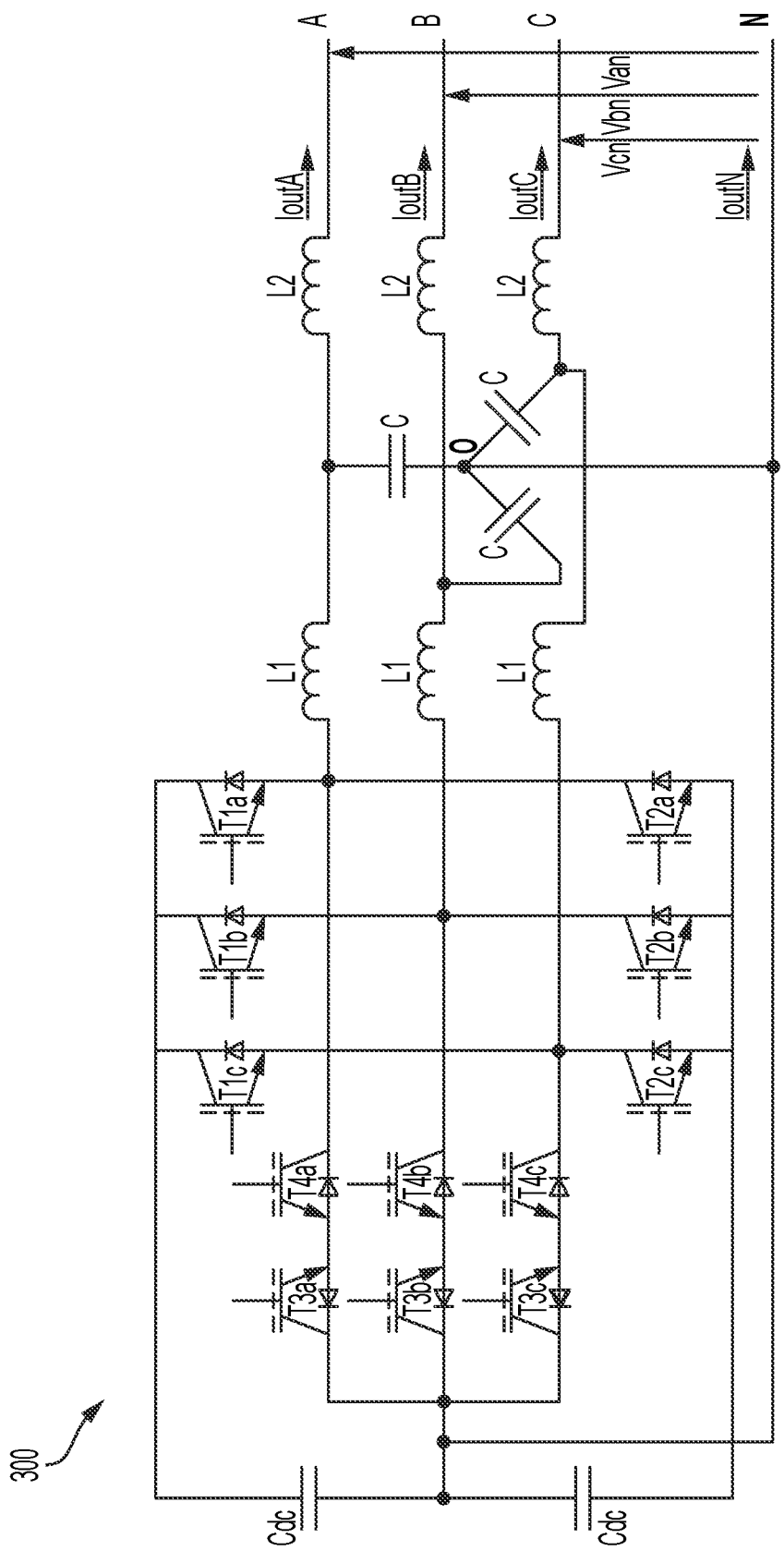
FIG. 3 shows an example power converter used for implementing a 4-wire AHF.
Figure 4:
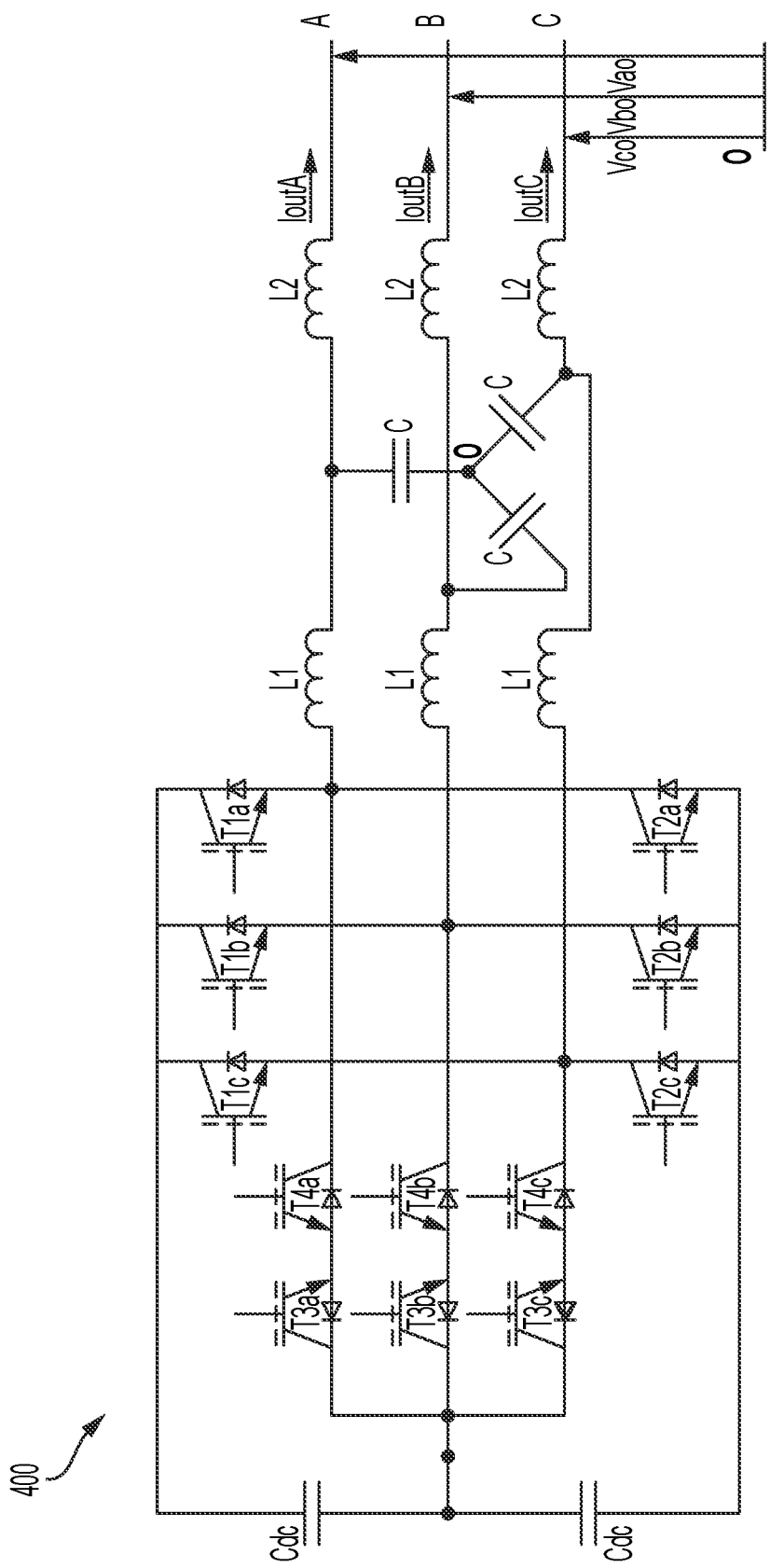
FIG. 4 shows an example power converter used for implementing a 3-wire AHF.

FIG. 3 shows a typical 3-level power converter 300 (shown as a T-type) used in a 4-wire AHF, while FIG. 4 shows its typical use in a 3-wire AHF 400. Each is equipped with an output filter circuit consisting of a network of inductors and capacitors (shown as an L-C-L type). The specific power converter and filter topology are shown only as example implementations. The neutral point output of the active filter (N) may be connected to the mid-point of the DC bus capacitors.

Note that, if the neutral connection terminal (N) of a 4-wire AHF is not connected to the system neutral, then a typical 4-wire AHF as shown in FIG. 3 can also function as a 3-wire AHF. In other words, most 4-wire AHFs can function as both a 4-wire AHF as well as a 3-wire AHF. Despite this, in some examples it may be commercially advantageous to use an AHF designed specifically for 3-wire only such as shown in FIG. 4 since such AHFs are more economical to build than a 4-wire AHF with comparable capacity due to the following reasons. Firstly, a 4-wire AHF must accommodate the extra neutral phase conductor which needs to be as large as three times the phase currents to account for worst-case neutral current. Secondly, a 3-wire AHF can take advantage of the 3-wire nature of the power converter and use the well-known 3-wire pulse-width-modulation (PWM) technique which allows switching of only two out of three legs at a single instance of time, thereby reducing the amount of PWM switching losses by ⅓. This in turn can reduce the sizing requirements of the power switches (e.g., insulated-gate bipolar transistors [IGBTs]). Lastly, due to the 3-wire connections, 3-wire AHFs can use only two internal current sensors instead of the three sensors required in a 4-wire AHF, thereby reducing costs.

Figure 5:
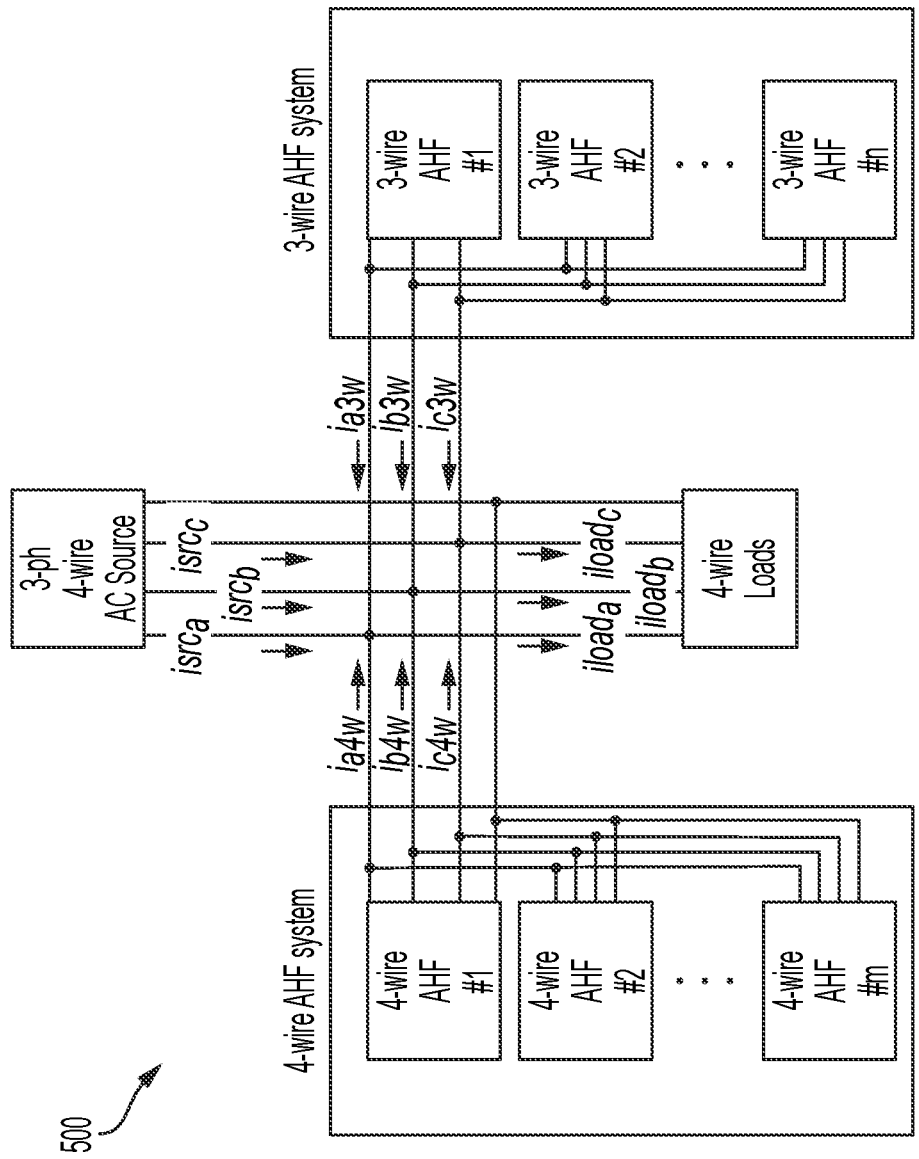
FIG. 5 shows an example parallel system of 3-wire and 4-wire AHFs.

With 3-wire AHFs being more economical to build and manufacture, but 4-wire AHFs still being required for neutral current compensation, there can arise a need to have both types of AHF coexist in a parallel-connected system. FIG. 5 shows such a system 500 in which a parallel network of m units of 4-wire AHFs are used in combination with n units of 3-wire AHFs. Each of the units can have different ampacity ratings. As in the single unit systems shown in FIG. 1 and FIG. 2, the goal of the parallel system is to compensate the load currents (iload$_a$, iload$_b$, and iload$_c$) such that the source currents (isrc$_a$, isrc$_b$, and isrc$_c$) can be free of harmonics or achieve desired power factor and/or balanced conditions. To prevent circulating current and unnecessary loading of each of the units, the total 3-wire units currents ($i_{a3w}$, $i_{b3w}$, and $i_{c3w}$) may be shared amongst the 3-wire units by the proportion of each unit size. Similarly, the total 4-wire units currents ($i_{a4w}$, $i_{b4w}$, and $i_{c4w}$) shall be shared amongst the 4-wire units by the proportion of each unit size.

An example way of operating paralleled 3-wire and 4-wire AHFs as in FIG. 5 is to restrict the 4-wire units to produce only the zero component (neutral component) of the compensation current and to let the 3-wire units produce all of the non-zero component. An advantage of this method is that the 3-wire and 4-wire units can work independently, and no communication is needed between the two systems to achieve a correct paralleling. However, this method may not allow for a full utilization of the output capacity (for example, amperage capacity) of all the units in the system. For example, at times when there are no zero components of the load being present (e.g., when no 4-wire loads are flowing in the system), the 4-wire units may be left unused, even when the 4-wire units have the capability to produce non-zero components of the currents. With this method, the 4-wire units cannot be used to increase the total capacity of the 3-wire units, even when it has the capability to do so. Note that since most of the zero components may be triplen harmonics, a variation of this technique also includes letting the 4-wire units output only the triplen harmonics and leaving the rest (non-triplen) to be handled by the 3-wire units.

Examples of this disclosure include a method for parallel-mixing 3-wire AHFs and 4-wire AHFs to increase utilization of the amperage capacity of each of the units in a parallel system. In one example implementation, the method allocates all zero-component current to the 4-wire units. The method splits the non-zero components into proportions to be implemented by the 4-wire units and the 3-wire units such that each of the units in the parallel system can be loaded up to its respective capacity. Various examples include calculating a ratio p<1.0 equaling a proportion of the non-zero compensation current to be implemented by the 4-wire units such that the 4-wire units' capacity can be more fully utilized. The remaining proportion (1-p) of the non-zero components may be allocated to the 3-wire units.

Figure 6A:
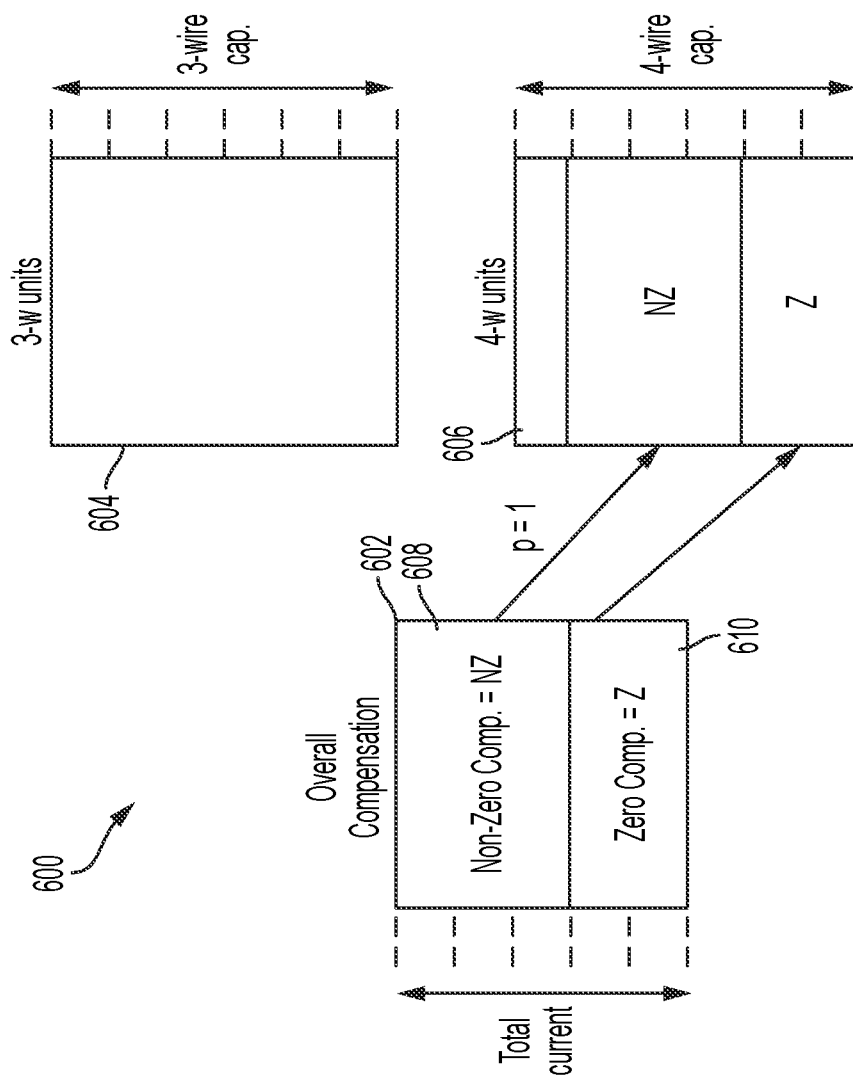
FIG. 6A shows an example implementation of how zero and non-zero current components may be distributed between the 3-wire and 4-wire AHF with priority given to 4-wire units.

FIGS. 6A-6D each illustrate a block diagram of a distribution scheme of zero and non-zero compensation current in a parallel system according to an example. FIG. 6A illustrates a block diagram of a first current compensation scheme 600 according to an example. The first current compensation scheme 600 illustrates an overall current 602 being divided between, or assigned to, one or more 3-wire units 604 and one or more 4-wire units 606. The one or more 3-wire units 604 and one or more 4-wire units 606 may provide compensation current to a load in the assigned amount. The overall current 602 includes a non-zero component 608 and a zero component 610.

Under the first current compensation scheme 600, the entirety of the overall current 602 is assigned to the one or more 4-wire units 606. In various examples, the one or more 4-wire units 606 are given priority over the one or more 3-wire units 604 to provide compensation current. For example, if the overall current 602 is within the total capacity of the one or more 4-wire units 606, the entirety of the overall current 602 may be assigned to the one or more 4-wire units 606 as illustrated in the first current compensation scheme 600.

Figure 6B:
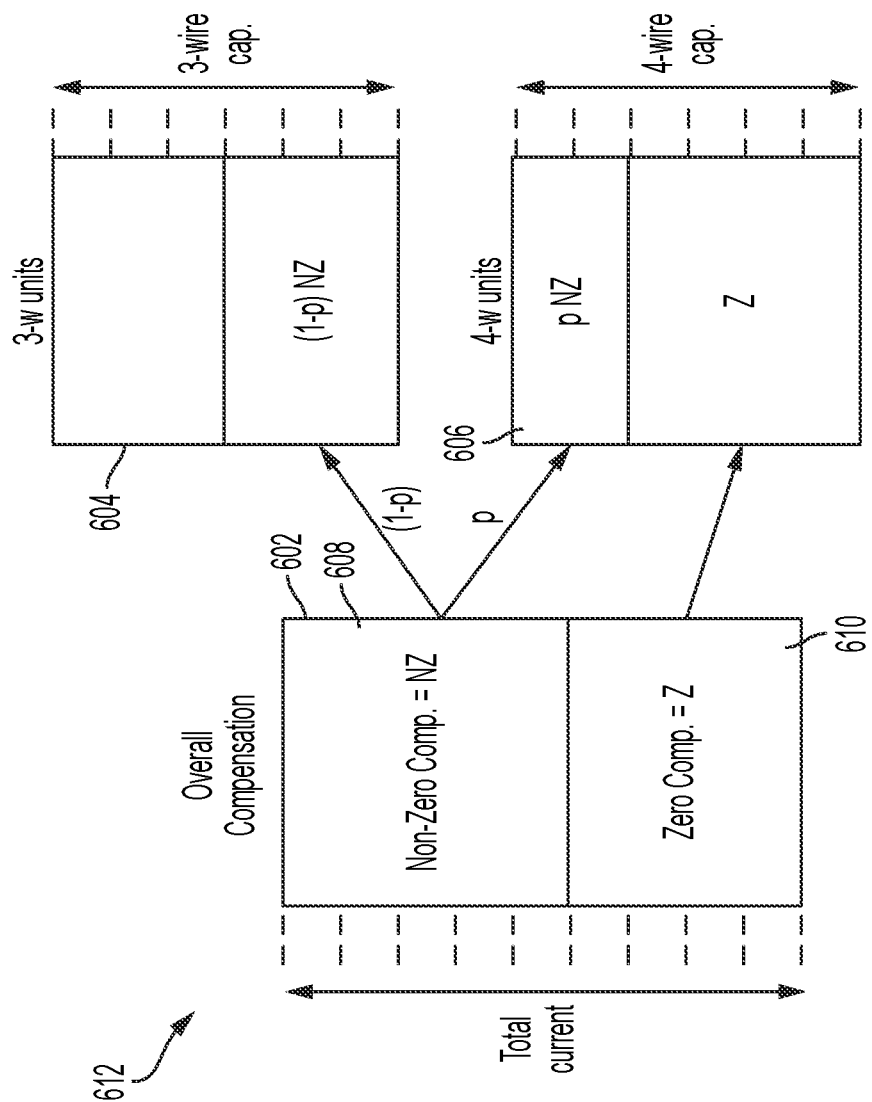
FIG. 6B shows another example implementation of how zero and non-zero current components may be distributed between the 3-wire and 4-wire AHF with priority given to 4-wire units.

FIG. 6B illustrates a second current compensation scheme 612 according to an example. Under the second current compensation scheme 612, the zero component 610 is assigned to the one or more 4-wire units 606, and the non-zero component 608 is divided between the one or more 3-wire units 604 and the one or more 4-wire units 606. In various examples, the one or more 4-wire units 606 are given priority over the one or more 3-wire units 604 to provide compensation current. A remaining capacity of the one or more 4-wire units 606 may be utilized to provide a portion p of the non-zero component 608, until the one or more 4-wire units 606 are at capacity. A remainder of the non-zero component 608 (1-p) may be assigned to the one or more 3-wire units 606. Examples of determining the ratio p are discussed in greater detail below.

Figure 6C:
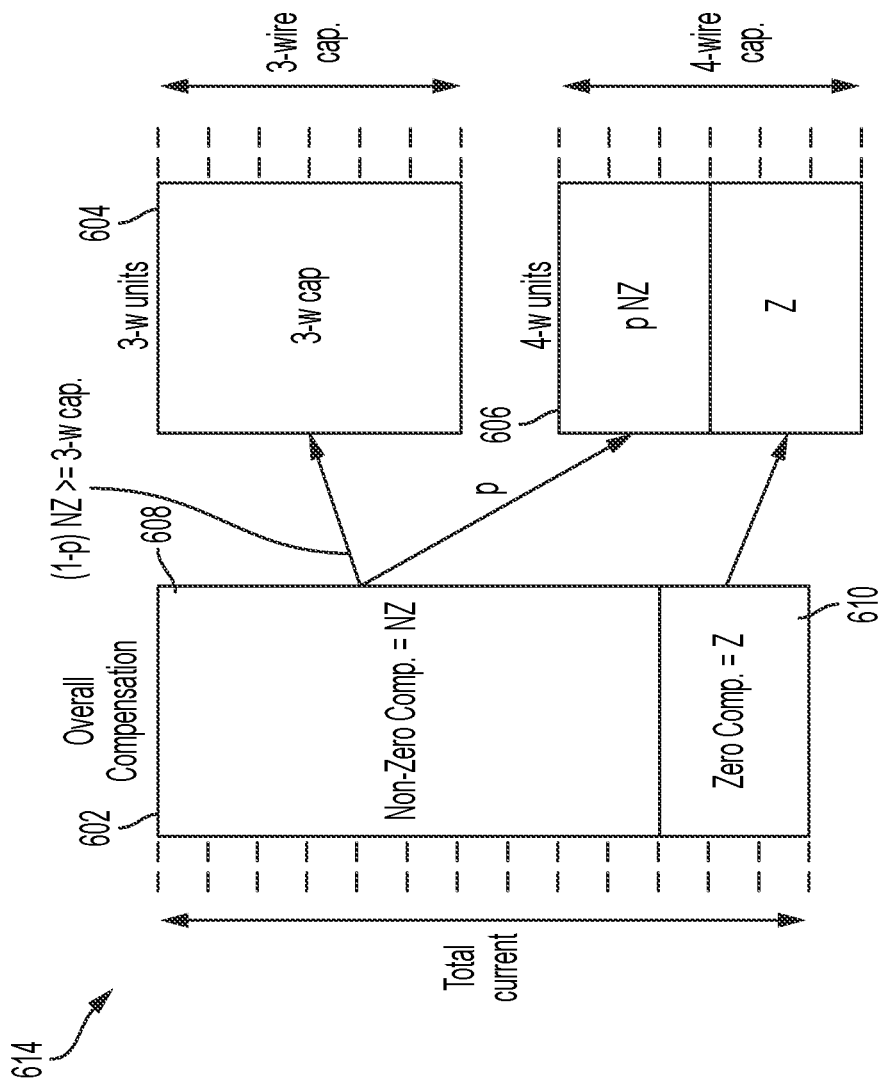
FIG. 6C shows another example implementation of how zero and non-zero current components may be distributed between the 3-wire and 4-wire AHF with priority given to 4-wire units.

FIG. 6C illustrates a third current compensation scheme 614. Under the third current compensation scheme 614, the zero component 610 is assigned to the one or more 4-wire units 606, and the non-zero component 608 is divided between the one or more 3-wire units 604 and the one or more 4-wire units 606. In various examples, the one or more 4-wire units 606 are given priority over the one or more 3-wire units 604 to provide compensation current. A remaining capacity of the one or more 4-wire units 606 may be utilized to provide a portion p of the non-zero component 608, until the one or more 4-wire units 606 are at capacity. A remainder of the non-zero component 608 (1-p) may be assigned to the one or more 3-wire units 604. However, in the third current compensation scheme 614, both the one or more 3-wire units 604 and the one or more 4-wire units 606 may be at capacity.

Figure 6D:
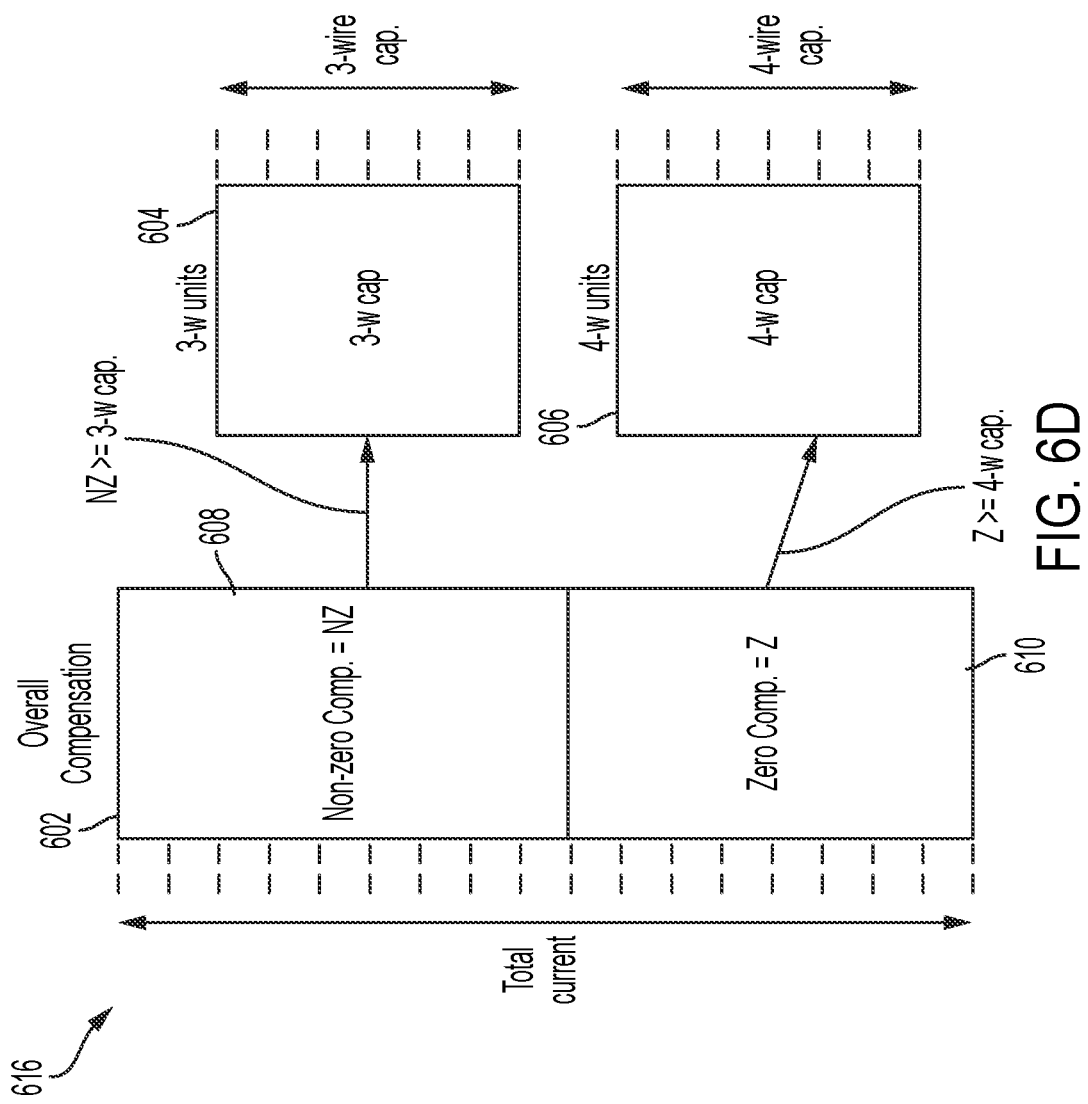
FIG. 6D shows another example implementation of how zero and non-zero current components may be distributed between the 3-wire and 4-wire AHF with priority given to 4-wire units.

FIG. 6D illustrates a fourth current compensation scheme 616. Under the fourth current compensation scheme 616, the zero component 610 is assigned to the one or more 4-wire units 606, which may consume the entire capacity of the one or more 4-wire units 606. In some examples, the zero component 610 may exceed the capacity of the one or more 4-wire units 606. The non-zero component 608 is assigned to the one or more 3-wire units 604, which may also consume the entire capacity of the one or more 3-wire units 604.

Figure 7A:
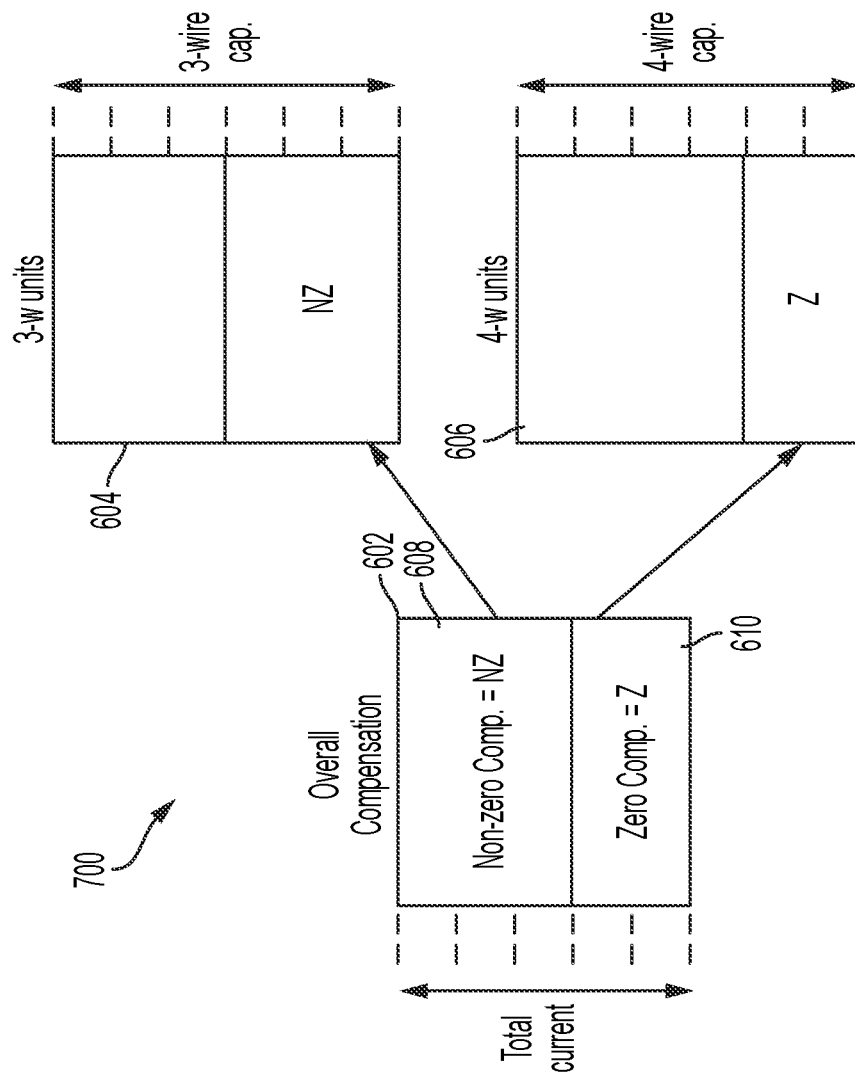
FIG. 7A shows another example of how zero and non-zero current components may be distributed between the 3-wire and 4-wire AHF with priority of non-zero compensation given to 3-wire AHF units first.
Figure 7B:
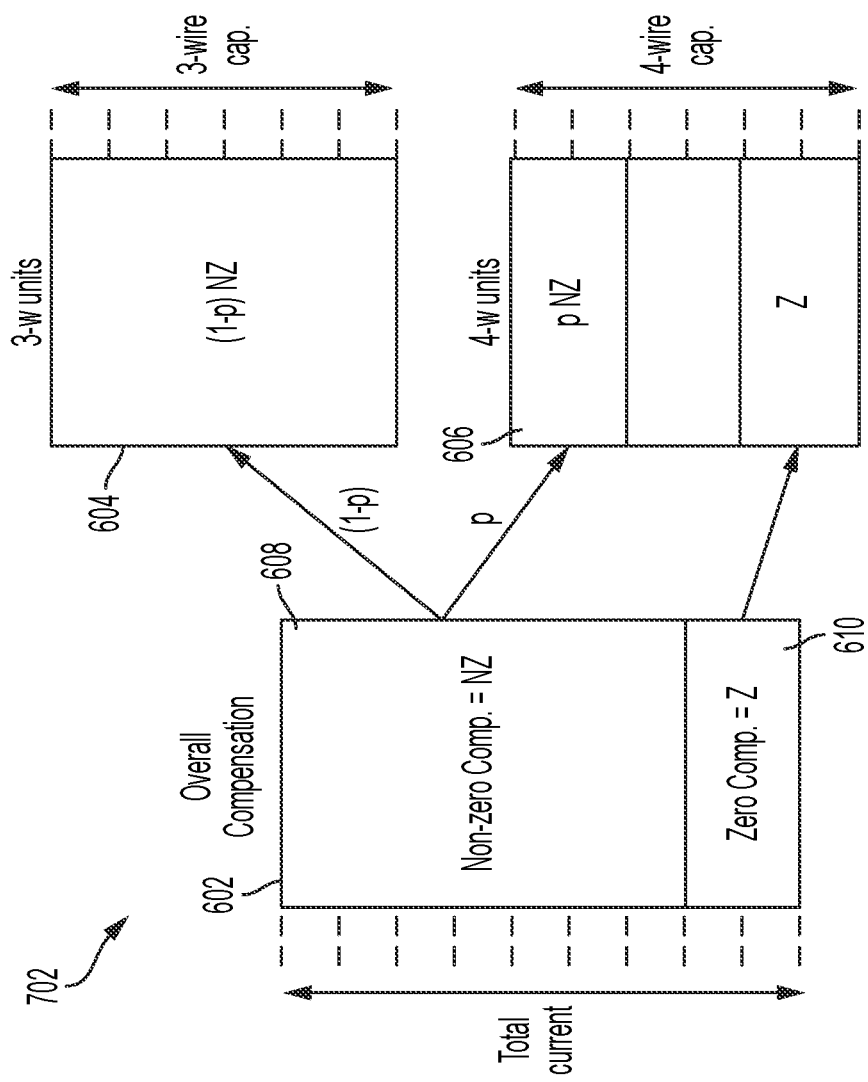
FIG. 7B shows another example of how zero and non-zero current components may be distributed between the 3-wire and 4-wire AHF with priority of non-zero compensation given to 3-wire AHF units first.

Accordingly, in various examples, the one or more 4-wire units 606 may be given priority in the allocation of the non-zero components of the compensation. For example, in some implementations, only after the one or more 4-wire units 606 have been fully loaded to their full capacities will the remainder of the non-zero component 608 be allocated to the one or more 3-wire units 604. An alternative of this method is also possible, for example, in which the priority of the allocation of the non-zero component 608 is first given to the one or more 3-wire units 604. For example, FIG. 7A illustrates a fifth current compensation scheme 700 in which the non-zero component 608 is first provided to the one or more 3-wire units 604, and the zero component 610 is provided to the one or more 4-wire units 606. In the fifth current compensation scheme 700, the non-zero component 608 may be less than a capacity of the one or more 3-wire units 604. FIG. 7B illustrates a sixth current compensation scheme 702, which is substantially similar to the fifth current compensation scheme 700 but in which the one or more 3-wire units 604 receive a full allocation of the non-zero component 608 (for example, because the one or more 3-wire units 604 are at a full capacity) and the one or more 4-wire units 606 receive a remainder of the non-zero component 608 while still receiving the zero component 610.

Figure 8:
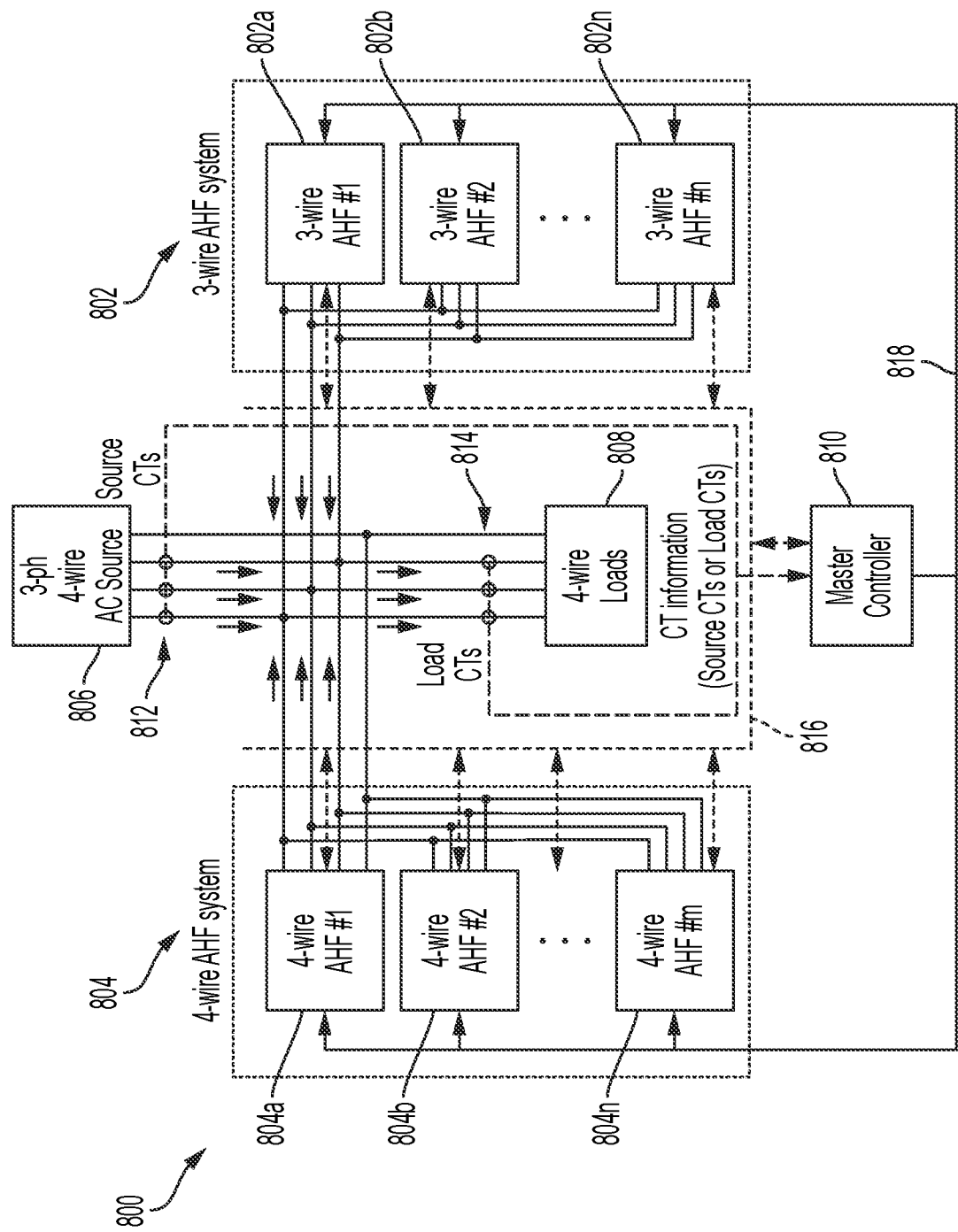
FIG. 8 shows an example implementation of a paralleling method.

FIG. 8 illustrates a block diagram of a power system 800 according to an example. The power system 800 includes one or more 3-wire AHFs 802 ("3-wire units 802"), one or more 4-wire AHFs 804 ("4-wire units 804"), at least one 3-phase, 4-wire AC source 806 ("AC source 806"), one or more 4-wire loads 808 ("load 808"), at least one controller 810, one or more source CTs 812 ("source CTs 812"), and one or more load CTs 814 ("load CTs 814"). The AC source 806 is coupled to, and is configured to provide AC power to, the loads 808. The units 802, 804 are coupled to, and are configured to provide compensation current to, the loads 808. The source CTs 812 are coupled to, and are configured to measure a current output by, the AC source 806. The load CTs 814 are coupled to, and are configured to measure a current provided to, the load 808.

The controller 810 is communicatively coupled to the 3-wire units 802, the 4-wire units 804, the source CTs 812, and the load CTs 814. Although a communicative coupling between the controller 810 and the CTS 812, 814 is not illustrated in the figures for purposes of clarity, the controller 810 may be communicatively coupled to the CTs 812, 814 via one or more wired or wireless communication media. In some examples, the controller 810 is a component of at least one of the units 802, 804, and is illustrated as a separate component for purposes of explanation only. The source CTs 812 and load CTs 814 are configured to provide source-current information and load-current information, respectively, to the controller 810. The controller 810 is configured to determine a total compensation current to achieve desired AHF objectives, such as harmonics compensation, power-factor correction, load balancing, and so forth. The controller 810 decomposes the total compensation current into zero and non-zero components. The controller 810 may implement any of the current compensation schemes discussed above. For example, the controller 810 may allocate the zero component of the total compensation current to the 4-wire units 804. The controller 810 may also calculate a ratio p indicating a distribution of the non-zero component between the units 802, 804.

To determine the ratio p, the controller 810 may access information regarding the total capacity of the 4-wire units 804 and the 3-wire units 802. This information can be shared amongst the units 802, 804 and/or the controller 810. For example, the 3-wire units 802 and 4-wire units 804 may be bidirectionally communicatively coupled to each other via a wired or wireless communication medium 816. In some examples, this bidirectional communication can be used to share voltage- and current-metering information for display purposes, alarms, faults, and so forth, as well as sharing commands and settings amongst the units 802, 804. The controller 810 may broadcast the total compensation current information on a separate fast-communication bus 818 along with the ratio p and a total capacity of each of the 3-wire units 802 and 4-wire units 804. In some examples, however, the controller 810 may use the wired or wireless communication medium 816 to broadcast the total compensation current information along with the ratio p and a total capacity of each of the 3-wire units 802 and 4-wire units 804 (for example, if enough bandwidth is available on the wired or wireless communication medium 816 and the timeliness of delivering the information is not a concern). Using the information, each of the units 802, 804 may be capable of determining a respective reference current based on information indicative of a capacity of the respective unit and a type of the respective unit (for example, 4-wire or 3-wire) such that each unit gets a share of the total compensation current in proportion to a capacity of the units 802, 804.

Figure 9:
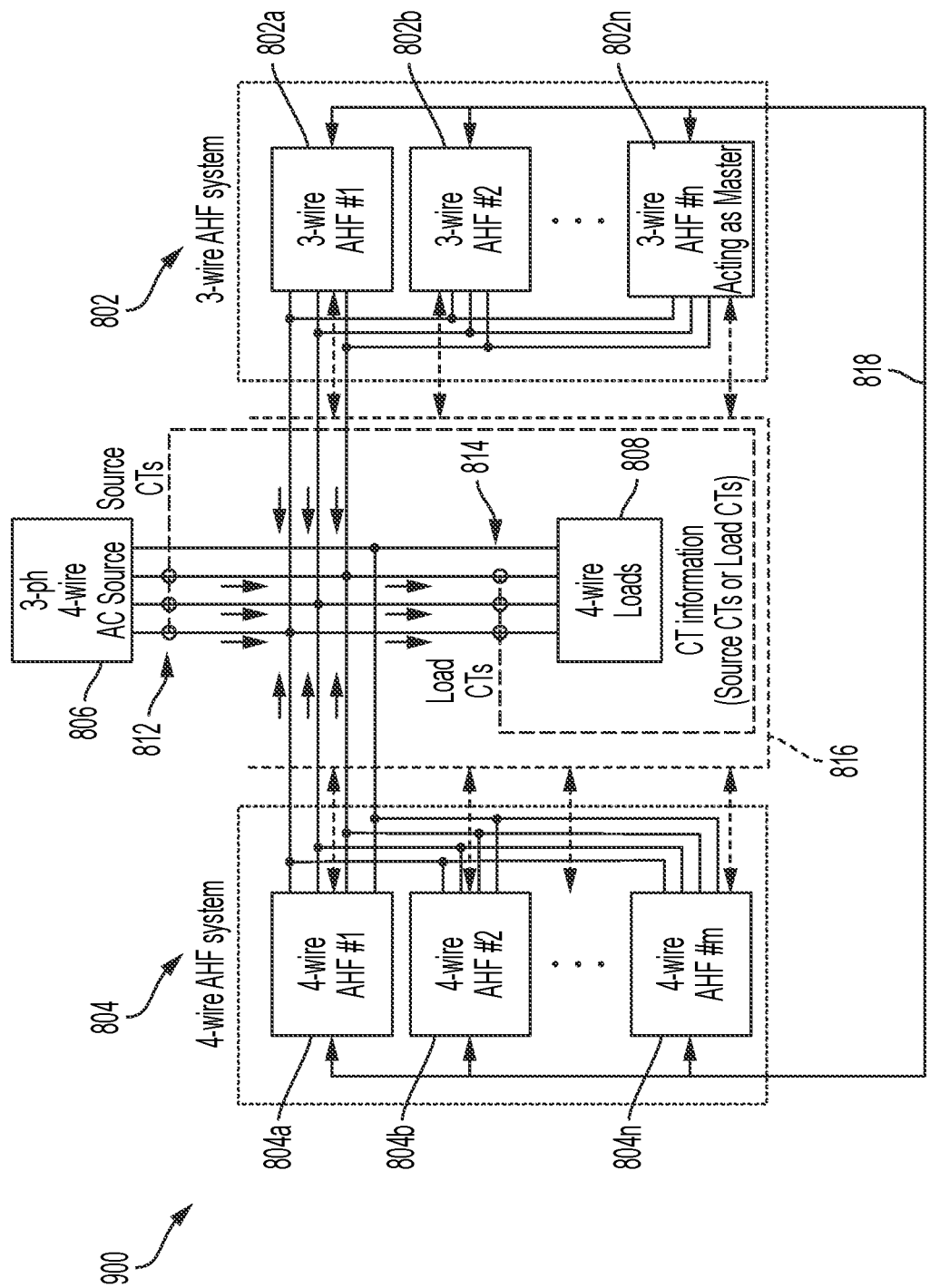
FIG. 9 shows an alternative implementation of the paralleling method (e.g., with master controller role implemented by one of the units in the parallel system)

It is to be appreciated that in some examples, the controller 810 may be physically distinct from the units 802, 804. In other examples, the controller 810 may be a component of one or more of the units 802, 804. In various examples, one or more of the units 802, 804 may include a controller. For example, the controller 810 may be a master controller configured to perform the processes discussed above, and each of the units 802, 804 may include a respective slave controller. In another example, one of the units 802, 804 may include a master controller (for example, substantially similar to the controller 810), and the remaining units may include controllers configured to act as slave controllers. FIG. 9 illustrates an example of a power system 900 in which each of the units 802a, 802b, 804 act as slave units (for example, by including slave controllers) and the unit 802n acts as a master unit (for example, by including a master controller substantially similar or identical to the controller 810). In some examples, the load- and source-current information can be wired to one or more of the units 802, 804, and a slave controller corresponding to any of the units 802, 804 can function as a master controller if the master controller fails, providing a level of redundancy in the power system 800.

Figure 10:
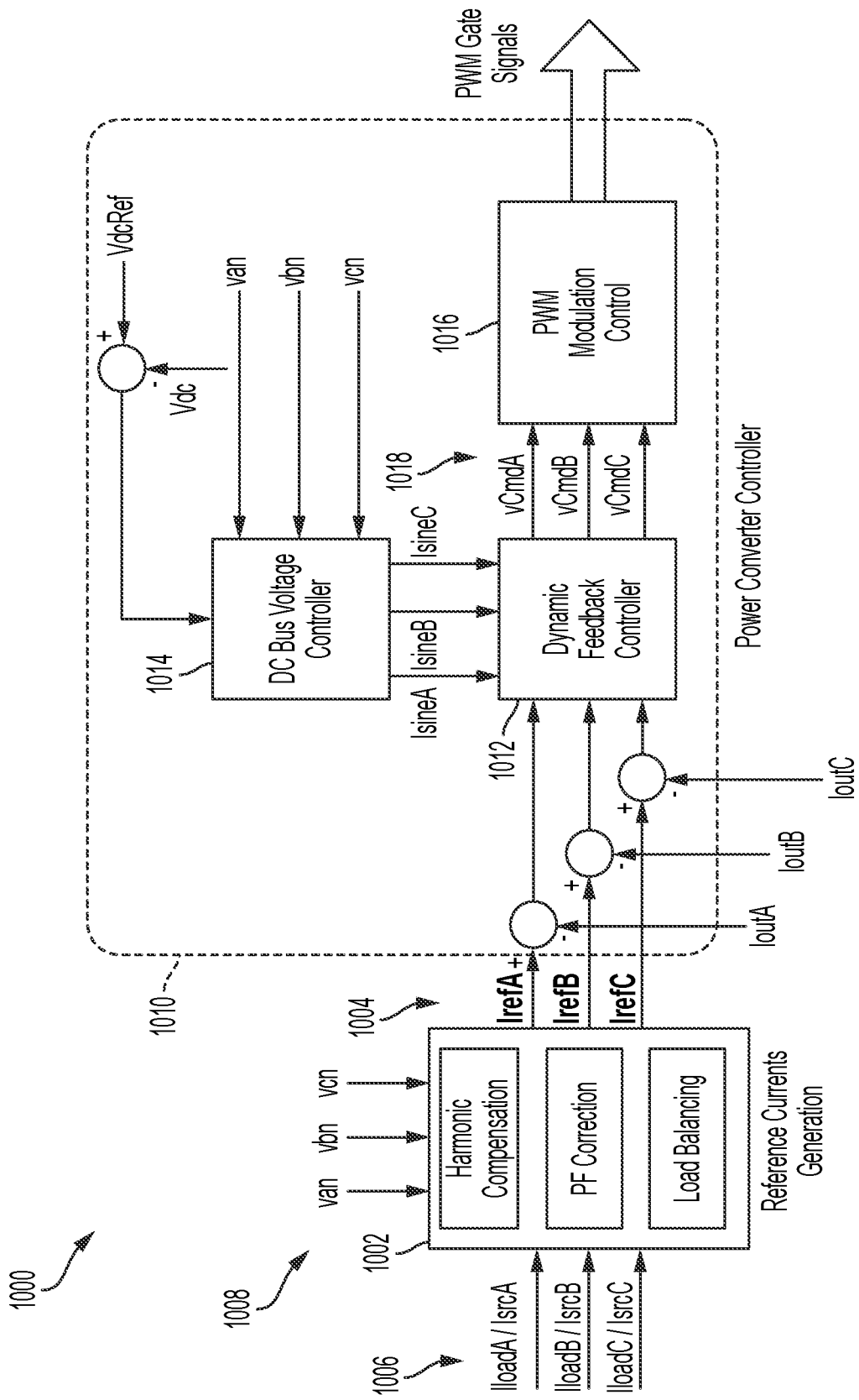
FIG. 10 shows an example control method for a single 3 or 4-wire AHF.

In various examples, each of the units 802, 804 may operate in a similar manner as a variable- or programmable-current source. FIG. 10 illustrates a block diagram of an AHF control scheme 1000 according to one example. A reference generation block 1002 generates reference currents 1004 (iref$_a$, iref$_b$, and iref$_c$) based on measured system currents 1006 (IloadA/IsrcA, IloadB/IsrcB, IloadC/IsrcC), which may be received from the source CTs 812 and the load CTs 814, and terminal voltages 1008 (van, vbn, vcn) across the phase lines provided to the load 808. A converter-controller block 1010 produces PWM gate signals 1012 to be provided to the units 802, 804 (for example, to switches in the units 802, 804) such that the output currents 1004 (IoutA, IoutB, IoutC) follow the references and maintain a desired DC-bus voltage.

The converter-controller block 1010 includes a dynamic feedback controller 1012, a DC-bus-voltage controller 1014, and a PWM-modulation controller 1016. The dynamic feedback controller 1012 is configured to reduce an error between the reference current and an output current to approximately zero, and outputs command-voltage signals 1018 (vCmdA, vCmdB, vCmdC) indicative thereof. The DC-bus-voltage controller 1014 is configured to regulate a DC-bus voltage. The PWM-modulation controller 1016 is configured to determine or calculate the PWM gate signals 1012 based on the command-voltage signals 1018.

Figure 11A:
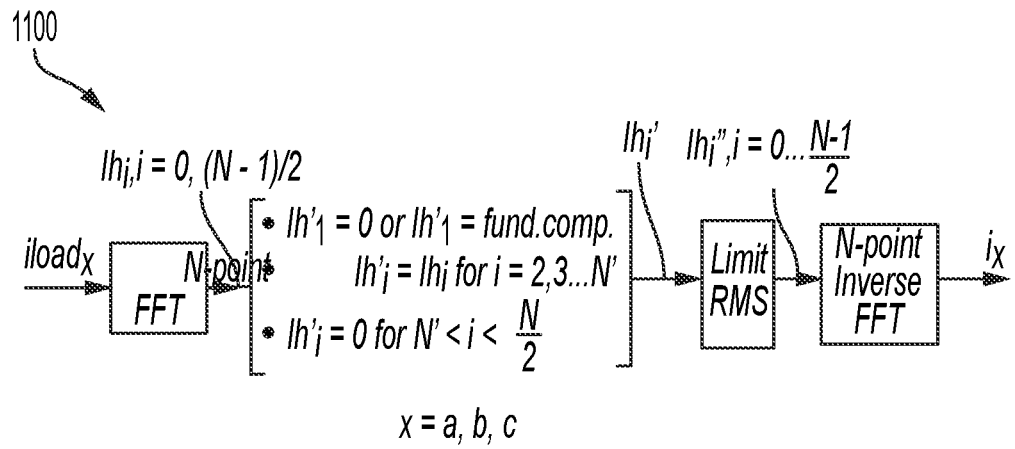
FIG. 11A shows an example technique to calculate AHF compensation reference currents (open-loop method)
Figure 11B:
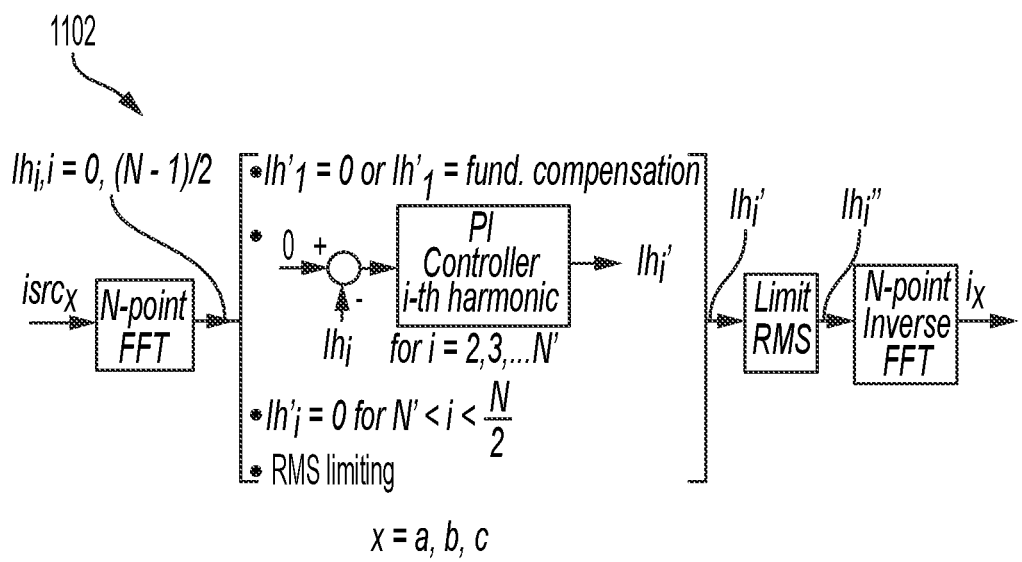
FIG. 11B shows another example technique to calculate AHF compensation reference currents (closed-loop method)

Various techniques may be implemented to compute the reference compensation currents 1004 for an active harmonic filter. For example, FIG. 11A illustrates a block diagram of a current-computation technique 1100 using a fast Fourier transform (FFT) method, in which the reference compensation currents 1004 are calculated from the inverse FFT of the measured load currents (for example, each phase current provided to the load 808 and measured by the load CTs 814) through a process known as an open-loop method. Processing of the load currents' FFT spectrums in an open-loop method may include removing the fundamental harmonics or higher-order harmonics as well as RMS-limiting of the total compensation spectrum. If desired, the fundamental-frequency compensation such as reactive-current compensation or load balancing may also be incorporated. Various known techniques to calculate these fundamental-frequency compensation currents exist and will not be discussed here. Alternatively, the harmonics processing can be done as shown in FIG. 11B which is known as a closed-loop method. In the closed-loop method, the measured source currents (for example, each phase current provided by the AC source 806 and measured by the source CTs 812) instead are used. For each of the harmonics above a fundamental frequency that are desired to be controlled, a closed-loop PI controller is used to force each of the source current harmonics to zero as shown in FIG. 11B. FIG. 11B illustrates a block diagram of a second current-computation technique 1102 using an FFT method.

With reference to FIG. 8, suppose the reference currents for the total output currents of the 3-wire units 802 are given by iref$_{a3w}$, iref$_{b3w}$, and iref$_{c3w}$. Similarly, suppose the reference currents for the total output currents of the 4-wire units 804 are given by iref$_{a4w}$, iref$_{b4w}$, and iref$_{c4w}$. The reference currents for the total compensation currents iref$_a$, iref$_b$, and iref$_c$, can then be expressed as:

$$\text{iref}_a = \text{iref}_{a4w} + \text{iref}_{a3w} \tag{1.a}$$

$$\text{iref}_b = \text{iref}_{b4w} + \text{iref}_{b3w} \tag{1.b}$$

$$\text{iref}_c = \text{iref}_{c4w} + \text{iref}_{c3w} \tag{1.c}$$

Also, suppose a capacity (for example, an amperage rating) of an arbitrary i-th 3-wire unit of the 3-wire units 802 is given by cap3w$_i$ and of an arbitrary i-th 4-wire unit of the 4-wire units 804 is given by cap4w$_i$, then the total capacity of the 3-wire units 802 and the 4-wire units 804 are:

$$\text{cap3}w = \Sigma_{i=1}^n \text{cap3}w_i \tag{2.a}$$

$$\text{cap4}w = \Sigma_{i=1}^m \text{cap4}w_i \tag{2.b}$$

respectively. To allow the units 802, 804 to share the output currents based on the proportion of each unit's respective capacity, then the reference currents for each of the 3-wire units 802 and the 4-wire units 804 should be calculated from the respective unit type as:

$$\text{iref}_{x3w_i} = \frac{\text{cap3}w_i}{\text{cap3}w} \text{iref}_{x3w} \text{ for } x = a, b, c \text{ and } i = 1 \ldots n \tag{3.a}$$

$$\text{iref}_{x4w_i} = \frac{\text{cap4}w_i}{\text{cap4}w} \text{iref}_{x4w} \text{ for } x = a, b, c \text{ and } i = 1 \ldots m \tag{3.b}$$

In some examples, the reference currents for the units 802, 804 are first decomposed into zero and non-zero components. The zero component of the reference currents given in (1) can be defined as follows $$\text{iref}_0 = \frac{1}{3}(\text{iref}_a + \text{iref}_b + \text{iref}_c) \tag{4}$$

Since iref$_{a3w}$+iref$_{b3w}$+iref$_{c3w}$=0, then $$\text{iref}_0 = \frac{1}{3}(\text{iref}_{a4w} + \text{iref}_{b4w} + \text{iref}_{c4w}) \equiv \text{iref}_{04w} \tag{5}$$

The non-zero components of the total reference currents are defined from the phase currents with the 0-component removed from each phase current as follows:

$$iref_\alpha = iref_a - iref_0 \quad (6.a)$$

$$iref_\beta = iref_b - iref_0 \quad (6.b)$$

$$iref_\gamma = iref_c - iref_0 \quad (6.c)$$

It can be seen that $iref_\alpha + iref_\beta + iref_\gamma = 0$ or $iref_\gamma = -iref_\alpha - iref_\beta$. Since $iref_\gamma$ can be derived from $iref_\alpha$ and $iref_\beta$, this third component of the non-zero current may be dropped. The remaining two non-zero components $iref_\alpha$ and $iref_\beta$ along with $iref_0$ may be used to define the original 3-phase quantities. In various examples, $iref_\alpha$, $iref_\beta$, and $iref_0$ as defined in (6.a), (6.b), and (4) are similar to the standard abc-to-dq0 stationary reference frame transformation (Park transformation), or Clarke transformation, and these standard transformations can also be used to obtain the decomposition of the reference currents into the zero and non-zero components.

With the zero component for the 4-wire units reference currents ($iref_{04w}$) defined as in (5), the non-zero components of the reference currents are:

$$iref_{\alpha 4w} = iref_{a4w} - iref_{04w} \quad (7.a)$$

$$iref_{\beta 4w} = iref_{b4w} - iref_{04w} \quad (7.b)$$

$$iref_{\gamma 4w} = iref_{c4w} - iref_{04w} \quad (7.c)$$

Or equivalently:

$$iref_{a4w} = iref_{\alpha 4w} + iref_{04w} \quad (8.a)$$

$$iref_{b4w} = iref_{\beta 4w} + iref_{04w} \quad (8.b)$$

$$iref_{c4w} = iref_{\gamma 4w} + iref_{04w} \quad (8.c)$$

For the 3-wire units 802, the non-zero components of the reference currents are identical to the abc phase currents since the zero component $iref_{o3w} = 0$ $$iref_{\alpha 3w} = iref_{a3w} \quad (9.a)$$

$$iref_{\beta 3w} = iref_{b3w} \quad (9.b)$$

$$iref_{\gamma 3w} = iref_{c3w} \quad (9.c)$$

In various examples, the zero component of the reference current is first assigned to the 4-wire units 804 as given in (5), with the constraint that the RMS magnitude is limited to the total 4-wire capacity cap4w, that is:

$$|iref_{04w}| = \min(|iref_0|, cap_{4w}) \quad (10)$$

Once the zero current is allocated, the non-zero components of the reference currents ($iref_\alpha$, $iref_\beta$, and $iref_\gamma$) may be divided between the 4-wire units 804 and 3-wire units 802. In various examples, the remaining capacity of the 4-wire units 804 is first used in allocating the non-zero components of the reference currents ($iref_\alpha$, $iref_\beta$, and $iref_\gamma$) before allocating the non-zero components of the reference currents ($iref_\alpha$, $iref_\beta$, and $iref_\gamma$) to the 3-wire units 802. For example, a ratio p of the non-zero component of the 4-wire output may be defined with respect to the total non-zero components.

$$iref_{\alpha 4w} = \rho iref_\alpha \quad (11.a)$$

$$iref_{\beta 4w} = \rho iref_\beta \quad (11.b)$$

$$iref_{\gamma 4w} = \rho iref_\gamma \quad (11.c)$$

It follows from (1) that:

$$iref_{\alpha 3w} = (1-\rho) \cdot iref_\alpha \quad (12.a)$$

$$iref_{\beta 3w} = (1-\rho) \cdot iref_\beta \quad (12.b)$$

$$iref_{\gamma 3w} = (1-\rho) \cdot iref_\gamma \quad (12.c)$$

To fully utilize the capacity (for example, the amperage capacity) of the 4-wire units 804, a ratio p may be determined that satisfies the following constraints:

$$|iref_{a4w}| \leq cap_{4w} \quad (12.a)$$

$$|iref_{b4w}| \leq cap_{4w} \quad (12.b)$$

$$|iref_{c4w}| \leq cap_{4w} \quad (12.c)$$

Using (8) and substituting (11), (12) may be rewritten as:

$$|iref_{a4w}| = |\rho \cdot iref_\alpha + iref_0| \leq cap_{4w} \quad (13.a)$$

$$|iref_{b4w}| = |\rho \cdot iref_\beta + iref_0| \leq cap_{4w} \quad (13.b)$$

$$|iref_{c4w}| = |\rho \cdot iref_\gamma + iref_0| \leq cap_{4w} \quad (13.c)$$

To determine p, equations (13a-13c) may be transformed into the frequency domain using the FFT technique. The squared RMS values of (13a-13c) in the frequency domain in terms of the harmonic's spectrum is given by $$|I_{a4w}|^2 = \Sigma_{h=1}^{N} |\rho I_{\alpha_h} + I_{0_h}|^2 \leq cap_{4w}^2 \quad (14.a)$$

$$|I_{b4w}|^2 = \Sigma_{h=1}^{N} |\rho I_{\beta_h} + I_{0_h}|^2 \leq cap_{4w}^2 \quad (14.b)$$

$$|I_{c4w}|^2 = \Sigma_{h=1}^{N} |\rho I_{\gamma_h} + I_{0_h}|^2 \leq cap_{4w}^2 \quad (14.c)$$

To find a ratio p that satisfies the inequalities (14), values of $\rho_a$, $\rho_b$, and $\rho_c$ are first determined that satisfy the equalities portions of (14), that is, $$|I_{a4w}|^2 = \Sigma_{h=1}^{N} |\rho_a I_{\alpha_h} + I_{0_h}|^2 \leq cap_{4w}^2 \quad (15.a)$$

$$|I_{b4w}|^2 = \Sigma_{h=1}^{N} |\rho_b I_{\beta_h} + I_{0_h}|^2 \leq cap_{4w}^2 \quad (15.b)$$

$$|I_{c4w}|^2 = \Sigma_{h=1}^{N} |\rho_c I_{\gamma_h} + I_{0_h}|^2 \leq cap_{4w}^2 \quad (15.c)$$

The ratio p that satisfies (14) then can be found from:

$$\rho = \min(\rho_a, \rho_b, \rho_c) \quad (16)$$

To solve for $\rho_x$ (x=a, b, c), equation (15.a) may be solved and solutions for equations (15.b) and (15.c) may have similar forms. Expanding (15.a) into real and imaginary parts yields:

$$|I_{a4w}|^2 = \Sigma_{h=1}^{N} |\rho_a [\text{Re}(I_{\alpha_h}) + j\text{Im}(I_{\alpha_h})] + [\text{Re}(I_{0_h}) + j\text{Im}(I_{0_h})]|^2 \quad (17)$$

Collecting the real and imaginary parts of (17) yields, $$|I_{a4w}|^2 = \Sigma_{h=1}^{N} |[\rho_a \text{Re}(I_{\alpha_h}) + \text{Re}(I_{0_h})] + j[\rho_a \text{Im}(I_{\alpha_h}) + \text{Im}(I_{0_h})]|^2 \quad (18)$$

Calculating the complex magnitude ($|\cdot|$) of the terms inside the summation in (18) yields, $$|I_{a4w}|^2 = \Sigma_{h=1}^{N} \{[\rho_a \text{Re}(I_{\alpha_h}) + \text{Re}(I_{0_h})]^2 + [\rho_a \text{Im}(I_{\alpha_h}) + \text{Im}(I_{0_h})]^2\} \quad (19)$$

which expands to, $$|I_{a4w}|^2 = \rho_a^2 \Sigma_{h=1}^{N} [\text{Re}(I_{\alpha_h})^2 + \text{Im}(I_{\alpha_h})^2] + 2\rho_a \Sigma_{h=1}^{N} [\text{Re}(I_{\alpha_h})\text{Re}(I_{0_h}) + \text{Im}(I_{\alpha_h})\text{Im}(I_{0_h})] + \Sigma_{h=1}^{N} [\text{Re}(I_{0_h})^2 + \text{Im}(I_{0_h})^2] \quad (20)$$

Equation (20) may be rewritten as, $$|I_{a4w}|^2 = A\rho_a^2 + B\rho_a + C \quad (21)$$

where A, B, C are defined as:

$$A = \Sigma_{h=1}^{N} [\text{Re}(I_{\alpha_h})^2 + \text{Im}(I_{\alpha_h})^2] \quad (22.a)$$

$$B=2\sum_{h=1}^{N}[\text{Re}(I_{\alpha_h})\text{Re}(I_{0_h})+\text{Im}(I_{\alpha_h})\text{Im}(I_{0_h})] \quad (22.b)$$

$$C=\sum_{h=1}^{N}[\text{Re}(I_{0_h})^2+\text{Im}(I_{0_h})^2] \quad (22.c)$$

Using (21) in (15.a) yields, $$|I_{a4w}|^2=(A\rho_a^2+B\rho_a+C)=\text{cap}_{4w}^2 \quad (21)$$

from which $p_a$ may be solved from the quadratic equation (24):

$$(A\rho_a^2+B\rho_a+C-\text{cap}_{4w}^2)=0 \quad (24)$$

Using quadratic formula, $p_a$ is obtained from $$\rho_a = \frac{-B+\sqrt{B^2-4A(C-cap_{4W}^2)}}{2A}, \text{ if } D=[B^2-4A(C-cap_{4w}^2)] \geq 0 \quad (25)$$

If (24) has no real solutions, that is, D=$B^2$−4A(C−$\text{cap}_{4w}^2$) <0 then $p_a$=1. This corresponds to cases in FIG. 6A and FIG. 7A. In summary, $$\rho_a = \begin{cases} \frac{-B+\sqrt{D}}{2A} & \text{if } D \geq 0 \\ 1 & \text{otherwise} \end{cases}, 0 \leq \rho_a \leq 1 \quad (26)$$

with D=[$B^2$−4A(C−$\text{cap}_{4w}^2$)], and A, B, C as defined in (22) $p_b$ and $p_c$ can be found using the same formula by substituting $I_{\alpha_h}$ in the expression for A and B in (22) with $I_{\beta_h}$ and $I_{\gamma_h}$ respectively.

Figure 12:
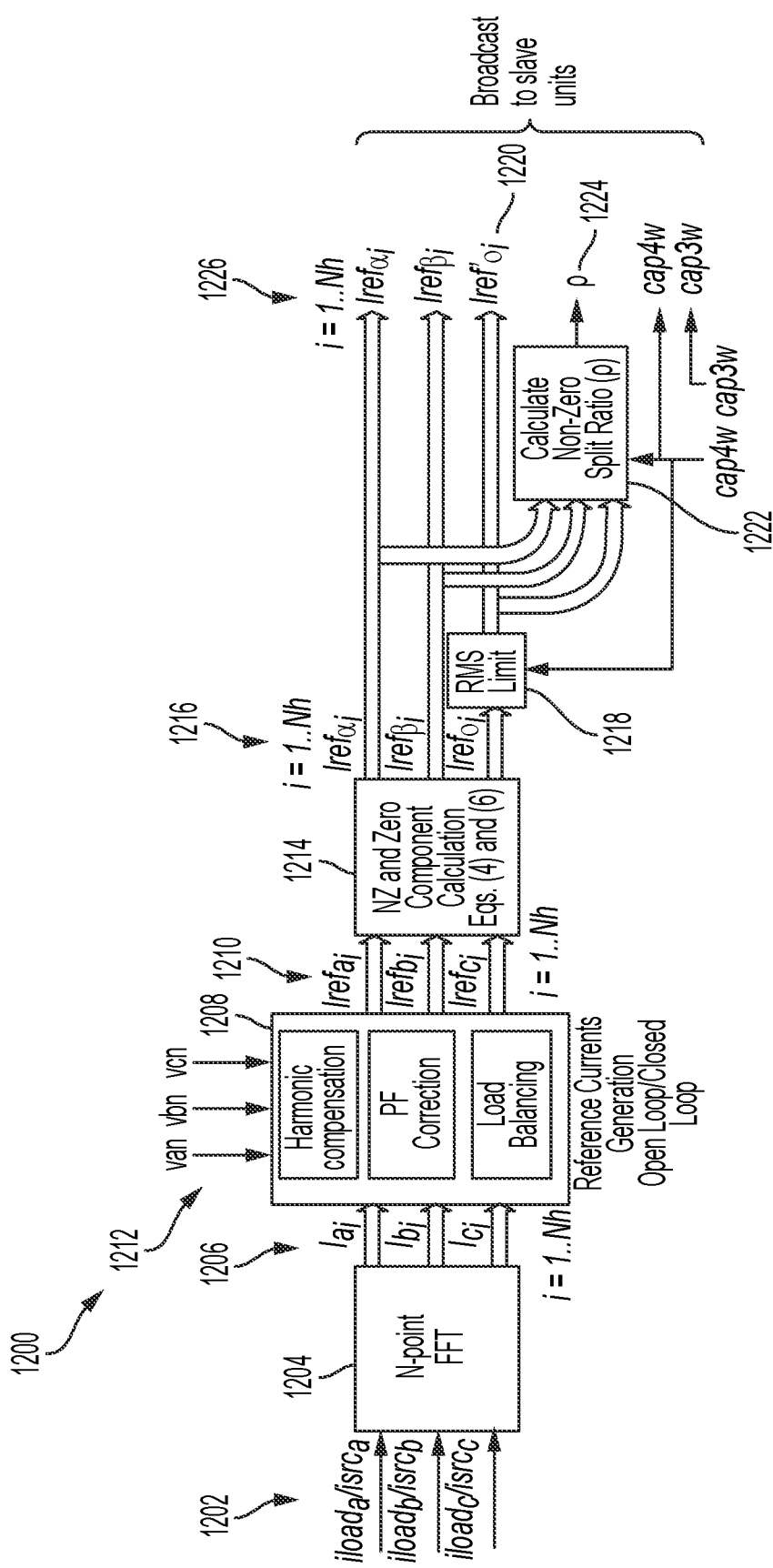
FIG. 12 shows an example of a master controller's control computations occurring, for example, at a fundamental period T1.
Figure 13:
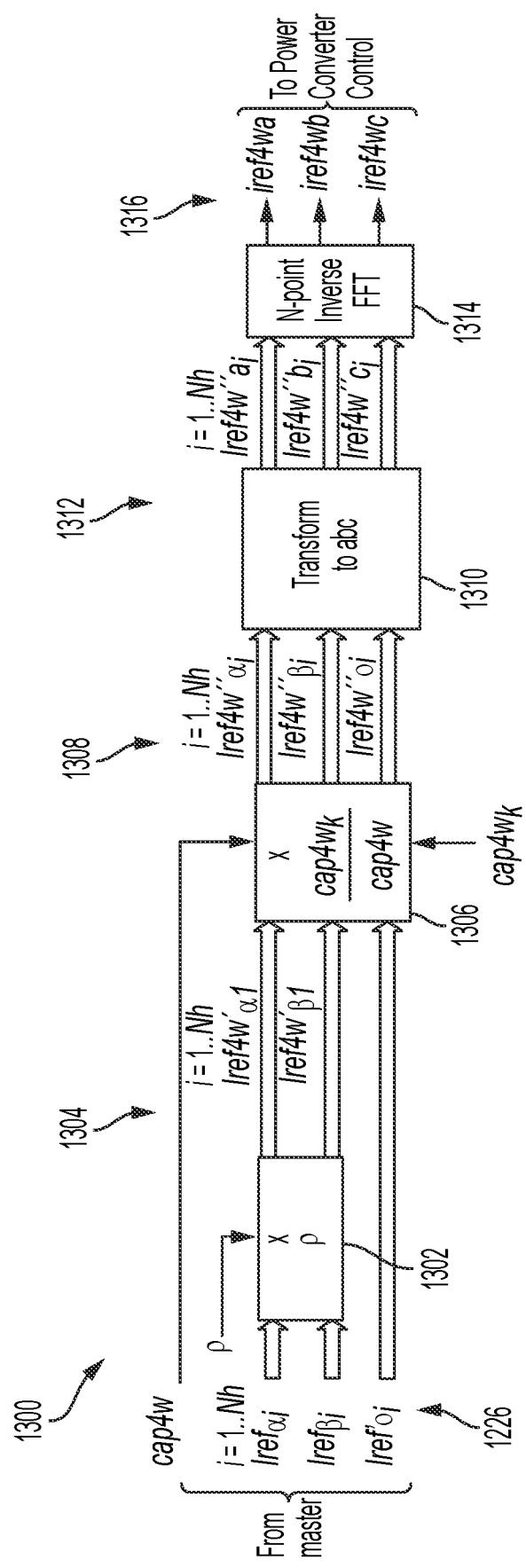
FIG. 13 shows example 4-wire slave units control computations occurring, for example, at a fundamental period T1.
Figure 14:
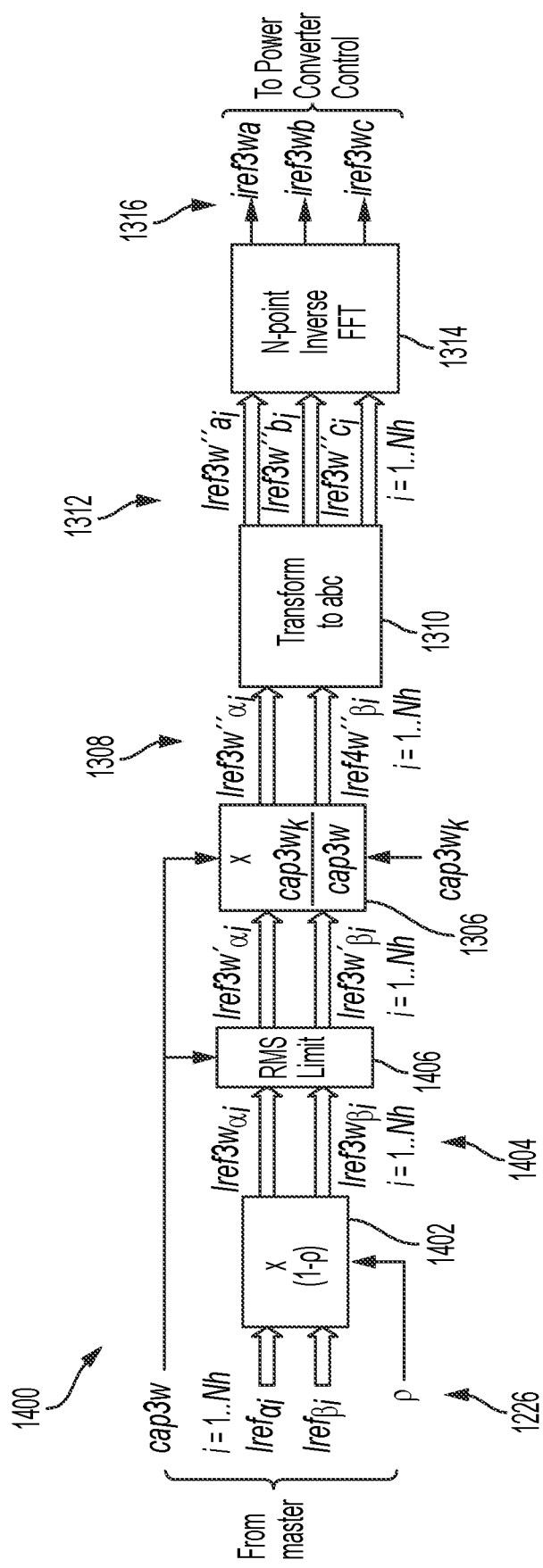
FIG. 14 shows example 3-wire slave units control computations occurring, for example, at a fundamental period T1.

FIG. 12, FIG. 13, and FIG. 14 show diagrams of control computations that may be performed by one or more controllers. In some examples, the controller 810 executes the control computations of FIGS. 12-14. In various examples, each of the units 802, 804 includes at least one controller, which may be a master or slave controller, configured to perform the control computations of FIGS. 12-14. In at least one example, the control computations of FIGS. 12-14 may be performed by each of the controllers at each fundamental harmonic periodic cycle of the source voltage T1, that is, the AC voltage provided by the AC source 806 (for example, every 20 ms or 16.667 ms for a 50 Hz or 60 Hz AC signal, respectively). In some examples, T1 can be determined using a phase-locked loop.

FIG. 12 illustrates a control diagram indicative of a control scheme 1200 according to an example. In at least one example, the control scheme 1200 may be executed by the controller 810, which may be internal or external to at least one of the units 802, 804. For example, the controller 810 may execute the control scheme 1200 repeatedly, such as at every period T1 of an AC voltage received from the AC source 806.

The controller 810 receives current information 1202 from the source CTs 812 and/or load CTs 814 indicative of source currents and load currents, respectively, on each phase. In various examples, the currents are sampled at the rate of N-times the fundamental period T1 and stored into memory buffers of length N. At a first control block 1204, the controller 810 determines N. For efficient computation N may be chosen as a power of 2. By the Nyquist theorem, N may be chosen to be greater than 2 times the harmonic frequencies of interest to be controlled, denoted as Nh. For example, if it is desired to control harmonics up to 50$^{th}$ harmonics then Nh=50, which requires N>2×Nh=100. In this example, the smallest N that is also a power of 2 is equal to 128. The FFT calculations results are the harmonic spectrum denoted by N/2 complex numbers $I_{a_i}$, $I_{b_i}$, $$I_{b_i}i=0, \ldots, \frac{N}{2}-1.$$

The DC contents (i=0) and the harmonics spectrum greater than the Nh-th harmonic can be ignored since they are not needed in the subsequent calculations. The first control block 1204 yields the complex currents $I_{a_i}$, $I_{b_i}$, $I_{b_i}$ 1206 which are provided to a second control block 1208.

At the second control block 1208, the harmonic spectrum $I_{a_i}$, $I_{b_i}$, $I_{b_i}$, i=1, . . . , Nh is used to compute and output total load compensation currents 1210 based on the AHF objectives (harmonic compensation, power factor correction, or load balancing) using the open-loop or closed loop method as in FIG. 11A or 11B, respectively, resulting in the complex harmonic spectrum of the reference currents: $\text{Iref}_{a_i}$, $\text{Iref}_{b_i}$, $\text{Iref}_{c_i}$, i=1, . . . , Nh. For power factor correction, phase-to-neutral voltages van, vbn, and vcn 1212 from the AC source 806 are received from at least one voltage sensor.

The total load compensation currents 1210 are provided to a third control block 1214. At the third control block 1214, the zero and non-zero components of the complex harmonic spectrum are computed using equations (4) and (6) as follows for i=1, . . . , Nh:

$$\text{iref}_{0_i}=\tfrac{1}{3}(\text{iref}_{a_i}+\text{iref}_{b_i}+\text{iref}_{c_i})$$

$$\text{iref}_{\alpha_i}=\text{iref}_{a_i}-\text{iref}_{0_i}$$

$$\text{iref}_{\beta_i}=\text{iref}_{b_i}-\text{iref}_{0_i}$$

The third control block 1214 outputs the reference currents ($\text{Iref}_{\alpha_i}$, $\text{Iref}_{\beta_i}$, $\text{Iref}_{0_i}$) 1216. The zero-current reference $\text{Iref}_{0_i}$ is provided to an RMS-limiting block 1218. At the RMS-limiting block 1218, the complex harmonic spectrum of the zero-current reference $\text{Iref}_{0_i}$ is limited such that the total RMS of the zero current is less than the total capacity of the 4-wire units 804 cap4w.

$$Iref'_{0_i} = \begin{cases} \frac{cap4w}{|Iref_0|}Iref_{0_i}, & \text{if } |Iref_0| > cap4w \\ Iref_{0_i}, & \text{otherwise} \end{cases}$$

$$\text{for } i = 1, \ldots, Nh \text{ with } |Iref_0| = \sqrt{\sum_{i=1}^{nH}|Iref_{0_i}|^2}$$

The RMS-limiting block 1218 outputs a limited zero-current reference $\text{Iref'}_{0_i}$ 1220. The third control block 1214 provides the non-zero components of the reference currents ($\text{Iref}_{\alpha_i}$, $\text{Iref}_{\beta_i}$, $\text{Iref}_{0_i}$) 1216, and the RMS-limiting block 1218 provides the limited zero-current reference $\text{Iref'}_{0_i}$ 1220, to each of the units 802, 804 other than the unit containing the controller 810, if applicable. The RMS-limiting block 1218 also provides the limited zero-current reference $\text{Iref'}_{0_i}$ 1220 to a ratio-calculator block 1222.

The ratio-calculator block 1222 determines a ratio p 1224 indicative of a distribution of the non-zero current between the units 802, 804. In various examples, the ratio-calculator block 1222 uses equations (16), (22), and (26) to determine the ratio p 1224. The ratio-calculator block 1222 may determine the ratio p 1224 based on a capacity of the 4-wire units 804 and based on the non-zero components of the reference currents ($\text{Iref}_{\alpha_i}$, $\text{Iref}_{\beta_i}$, $\text{Iref}_{0_i}$) 1216 and the limited zero-current reference $\text{Iref'}_{0_i}$ 1220, as discussed above. The ratio-calculator block 1222 may broadcast the ratio p 1224 to each of the units 802, 804 other than the unit containing the controller 810, if applicable. Output information 1226 collectively broadcast by the controller 810 to the slave units therefore includes the non-zero reference currents (Iref$_{\alpha_i}$, Iref$_{\beta_i}$), the limited zero-current reference Iref$_{0_i}$, the ratio p, capacity information for 3-wire units cap3w, and capacity information for 4-wire units cap4w.

Upon receiving the data from the controller 810, the slave units execute control computations. FIG. 13 illustrates a control diagram of a control scheme 1300 executed by 4-wire slave units of the 4-wire units 804. The 4-wire slave unit receives the output information 1226. At a first control block 1302, the non-zero reference harmonic spectrum is scaled by p:

$$iref4w'_{\alpha_i} = \rho \cdot iref_{\alpha_i}$$

$$iref4w'_{\beta_i} = \rho \cdot iref_{\beta_i}$$

for i=1, ..., Nh.

The scaled non-zero reference harmonic spectrum 1304 is provided to a second control block 1306. At the second control block 1306, local reference currents 1308 are derived for the unit by multiplying the scaled non-zero reference harmonic spectrum 1304 with the ratio of the unit's own respective capacity compared to the total 4-wire unit capacity cap4w:

$$Iref4w''_{x_i} = \frac{cap4w_i}{cap4w} Iref4w'_x \text{ for } x = \alpha, \beta, \text{ and } 0 \text{ and } i = 1, \ldots, Nh$$

At a third control block 1310, the local reference currents 1308 are transformed back to the abc space to generate transformed reference currents 1312:

$$iref4w''_{a_i} = iref4w''_{\alpha_i} + iref4w''_{0_i}$$

$$iref4w''_{b_i} = iref4w''_{\beta_i} + iref4w''_{0_i}$$

$$iref4w''_{c_i} = -(iref4w''_{\alpha_i} + iref4w''_{\beta_i}) + iref4w''_{0_i}$$

for i=1, ..., Nh.

At a fourth control block 1314, an N-point inverse FFT is executed to obtain the time domain reference currents iref$_{4wa}$, iref$_{4wb}$, and iref$_{4wc}$ 1316 for the unit to use in the AHF-control scheme 1000 discussed above. In various examples, the DC content and harmonic spectrum greater than Nh-th harmonic may be set to zero at this step.

FIG. 14 illustrates a control diagram of a control scheme 1400 executed by 3-wire slave units of the 3-wire units 802. The control scheme 1400 is similar to the control scheme 1300. However, as the zero component of the reference currents is zero, a first control block 1402, the non-zero reference harmonic spectrum is scaled by (1−p):

$$iref3w'_{\alpha_i} = (1-p) \cdot iref_{\alpha_i}$$

$$iref3w'_{\beta_i} = (1-p) \cdot iref_{\beta_i}$$

A scaled non-zero reference harmonic spectrum 1404 is provided to a second control block 1406, at which the total RMS of the non-zero currents are limited to the total capacity of the 3-wire units 802 cap3w as follows:

$$Iref3w'_{\alpha_i} = \begin{cases} \frac{cap3w}{|Iref3w_\alpha|} Iref3w_{\alpha_i}, & \text{if } |Iref3w_\alpha| > cap3w \\ Iref3w_{\alpha_i}, & \text{otherwise} \end{cases}$$

$$Iref3w'_{\beta_i} = \begin{cases} \frac{cap3w}{|Iref3w_\beta|} Iref3w_{\beta_i}, & \text{if } |Iref3w_\beta| > cap3w \\ Iref3w_{\beta_i}, & \text{otherwise} \end{cases}$$

The remainder of the control scheme 1400 may be substantially similar or identical to the control scheme 1300, except that a zero component of current is omitted, and is not repeated for purposes of brevity.

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein but rather, may be useful in substantially any application where it may be desired to distribute reference current in a system including one or more 3-wire AHFs and one or more 4-wire AHFs arranged in a parallel configuration. As discussed above, in certain systems there can arise a desire to have 3-wire AHFs and 4-wire AHFs connected in parallel. Examples discussed above include a method for parallel-mixing 3-wire AHFs and 4-wire AHFs to increase utilization of the amperage capacity of each of the units in a parallel system. In one example implementation, the method allocates all zero-component current to the 4-wire units. The method may split the non-zero components into proportions to be implemented by the 4-wire units and the 3-wire units such that each of the units in the parallel system can be loaded up to its respective capacity. Various examples include calculating a ratio p<1.0 equaling a proportion of the non-zero compensation current to be implemented by the 4-wire units such that the 4-wire units' capacity can be more fully utilized. The remaining proportion (1−p) of the non-zero components may be allocated to the 3-wire units.

While particular examples and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A power system comprising:
   at least one three-wire active harmonic filter (AHF) configured to be coupled to, and provide compensation current to, a three-phase load;

at least one four-wire AHF configured to be coupled to, and provide compensation current to, the three-phase load; and a controller configured to determine a total compensation current to provide to the three-phase load, the total compensation current including a zero component and a non-zero component;

determine an output capacity of the at least one three-wire AHF and the at least one four-wire AHF;

calculate a current-compensation ratio based on the output capacity of the at least one three-wire AHF and the at least one four-wire AHF; and control the at least one four-wire AHF to provide at least a portion of the non-zero component of the total compensation current to the three-phase load based on the current-compensation ratio.

2. The power system of claim 1, wherein the at least one three-wire AHF is coupled in parallel with the at least one four-wire AHF.

3. The power system of claim 1, wherein the controller is further configured to control the at least one four-wire AHF to provide a zero compensation current to the three-phase load to satisfy the zero component of the total compensation current.

4. The power system of claim 3, wherein the controller is configured to:

determine a remaining capacity of the at least one four-wire AHF after allocating the zero component of the total compensation current to the at least one four-wire AHF; and determine whether the remaining capacity of the at least one four-wire AHF exceeds the non-zero component of the total compensation current.

5. The power system of claim 4, wherein the controller is configured to allocate an entirety of the total compensation current to the at least one four-wire AHF responsive to determining that the remaining capacity of the at least one four-wire AHF exceeds the non-zero component of the total compensation current.

6. The power system of claim 5, wherein the current-compensation ratio is one, and wherein the at least one three-wire AHF does not provide a compensation current to the three-phase load.

7. The power system of claim 4, wherein the controller is configured to allocate the remaining capacity of the at least one four-wire AHF to non-zero compensation current responsive to determining that the non-zero component of the total compensation current exceeds the remaining capacity of the at least one four-wire AHF.

8. The power system of claim 7, wherein the at least a portion of the non-zero component of the total compensation current is a first portion of non-zero compensation current provided to the three-phase load, and wherein a remaining portion of the non-zero compensation current is allocated to the at least one three-wire AHF.

9. The power system of claim 8, wherein the current-compensation ratio is equal to the first portion of the non-zero compensation current divided by the non-zero compensation current.

10. A non-transitory computer-readable medium storing thereon sequences of computer-executable instructions for operating a power system including at least one three-wire active harmonic filter (AHF) and at least one four-wire AHF, each being configured to be coupled to, and provide compensation current to, a three-phase load, the sequences of computer-executable instructions including instructions that instruct at least one processor to:

determine a total compensation current to provide to the three-phase load, the total compensation current including a zero component and a non-zero component;

determine an output capacity of the at least one three-wire AHF and the at least one four-wire AHF;

calculate a current-compensation ratio based on the output capacity of the at least one three-wire AHF and the at least one four-wire AHF; and control the at least one four-wire AHF to provide at least a portion of the non-zero component of the total compensation current to the three-phase load based on the current-compensation ratio.

11. The non-transitory computer-readable medium of claim 10, wherein the instructions further instruct the at least one processor to control the at least one four-wire AHF to provide a zero compensation current to the three-phase load to satisfy the zero component of the total compensation current.

12. The non-transitory computer-readable medium of claim 11, wherein the instructions further instruct the at least one processor to:

determine a remaining capacity of the at least one four-wire AHF after allocating the zero component of the total compensation current to the at least one four-wire AHF; and determine whether the remaining capacity of the at least one four-wire AHF exceeds the non-zero component of the total compensation current.

13. The non-transitory computer-readable medium of claim 12, wherein the instructions further instruct the at least one processor to allocate an entirety of the total compensation current to the at least one four-wire AHF responsive to determining that the remaining capacity of the at least one four-wire AHF exceeds the non-zero component of the total compensation current.

14. The non-transitory computer-readable medium of claim 13, wherein the current-compensation ratio is one, and wherein the at least one three-wire AHF does not provide a compensation current to the three-phase load.

15. The non-transitory computer-readable medium of claim 12, wherein the instructions further instruct the at least one processor to allocate the remaining capacity of the at least one four-wire AHF to non-zero compensation current responsive to determining that the non-zero component of the total compensation current exceeds the remaining capacity of the at least one four-wire AHF.

16. The non-transitory computer-readable medium of claim 15, wherein the at least a portion of the non-zero component of the total compensation current allocated to the at least one four-wire AHF is a first portion of non-zero compensation current provided to the three-phase load, and wherein a remaining portion of the non-zero compensation current is allocated to the at least one three-wire AHF.

17. The non-transitory computer-readable medium of claim 16, wherein the current-compensation ratio is equal to the first portion of the non-zero compensation current divided by the non-zero compensation current.

18. A method of operating a power system including at least one three-wire active harmonic filter (AHF) and at least one four-wire AHF, each being configured to be coupled to, and provide compensation current to, a three-phase load, the method comprising:

determining a total compensation current to provide to the three-phase load, the total compensation current including a zero component and a non-zero component;

determining an output capacity of the at least one three-wire AHF and the at least one four-wire AHF;

calculating a current-compensation ratio based on the output capacity of the at least one three-wire AHF and the at least one four-wire AHF; and controlling the at least one four-wire AHF to provide at least a portion of the non-zero component of the total compensation current to the three-phase load based on the current-compensation ratio.

19. The method of claim 18, further comprising:

controlling the at least one four-wire AHF to provide a zero compensation current to the three-phase load to satisfy the zero component of the total compensation current;

determining a remaining capacity of the at least one four-wire AHF after allocating the zero component of the total compensation current to the at least one four-wire AHF; and determining whether the remaining capacity of the at least one four-wire AHF exceeds the non-zero component of the total compensation current.

20. The method of claim 19, further comprising allocating an entirety of the total compensation current to the at least one four-wire AHF responsive to determining that the remaining capacity of the at least one four-wire AHF exceeds the non-zero component of the total compensation current.

* * * * *